United States Patent
Chiyo et al.

(10) Patent No.: US 10,002,708 B2
(45) Date of Patent: Jun. 19, 2018

(54) COIL UNIT AND WIRELESS POWER TRANSMISSION DEVICE

(71) Applicant: TDK CORPORATION, Tokyo (JP)

(72) Inventors: Noritaka Chiyo, Tokyo (JP); Tetsuya Nishiyama, Tokyo (JP); Yasuhiro Terasaki, Tokyo (JP); Mitsunari Suzuki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 354 days.

(21) Appl. No.: 14/661,705

(22) Filed: Mar. 18, 2015

(65) Prior Publication Data

US 2015/0279556 A1    Oct. 1, 2015

(30) Foreign Application Priority Data

Mar. 25, 2014    (JP) .................................. 2014-061532

(51) Int. Cl.
*H01F 27/42* (2006.01)
*H01F 38/14* (2006.01)
(Continued)

(52) U.S. Cl.
CPC ............ *H01F 38/14* (2013.01); *B60L 11/182* (2013.01); *B60L 11/1824* (2013.01); *H02J 5/005* (2013.01); *H02J 7/025* (2013.01); *H02J 50/10* (2016.02); *H02J 50/40* (2016.02); *H02J 50/70* (2016.02); *B60L 2210/30* (2013.01); *B60L 2210/40* (2013.01); *B60L 2240/36* (2013.01);
(Continued)

(58) Field of Classification Search
None
See application file for complete search history.

(56) References Cited

U.S. PATENT DOCUMENTS 9,306,635 B2 *    4/2016    Kurs .................... H04B 5/0037
2003/0112000 A1    6/2003    Sorenson, Jr.
(Continued)

FOREIGN PATENT DOCUMENTS

CN    102545393 A    7/2012
JP    2010-172084    *    8/2010
(Continued)

OTHER PUBLICATIONS

Nov. 5, 2015 Extended Search Report issued in European Patent Application No. 15160595.3.
(Continued)

*Primary Examiner* — Cassandra Cox
(74) *Attorney, Agent, or Firm* — Oliff PLC

(57) ABSTRACT

A coil unit includes a non-magnetic conductive plate which is disposed in an arrangement direction of first and second coils have reverse winding direction to each other, and a magnetic body. The magnetic body includes a first portion which is positioned in an outer side than an outline of one side of the conductive plate in the arrangement direction of the first and second coils, and a second portion which is positioned in an outer side than an outline of the other side of the conductive plate in the arrangement direction of the first and second coils. When viewing from the arrangement direction of the first and second coils, the first and second portions are positioned on a side of the conductive plate where is opposite to a side which faces the first and second coils.

14 Claims, 8 Drawing Sheets

(51) Int. Cl.
*H02J 50/70* (2016.01)
*H02J 50/40* (2016.01)
*H02J 50/10* (2016.01)
*B60L 11/18* (2006.01)
*H02J 5/00* (2016.01)
*H02J 7/02* (2016.01)
*H01F 27/28* (2006.01)
*H01F 27/34* (2006.01)
*H01F 27/36* (2006.01)

(52) U.S. Cl.
CPC .......... *H01F 27/288* (2013.01); *H01F 27/346* (2013.01); *H01F 27/365* (2013.01); *Y02T 10/7005* (2013.01); *Y02T 10/7072* (2013.01); *Y02T 10/7241* (2013.01); *Y02T 90/12* (2013.01); *Y02T 90/121* (2013.01); *Y02T 90/122* (2013.01); *Y02T 90/127* (2013.01); *Y02T 90/14* (2013.01)

(56) References Cited

U.S. PATENT DOCUMENTS

| | | |
|---|---|---|
| 2012/0074899 A1 | 3/2012 | Tsai et al. |
| 2012/0153741 A1* | 6/2012 | Yamamoto ............... H02J 5/005 307/104 |
| 2012/0326499 A1* | 12/2012 | Ichikawa ............... B60L 11/182 307/9.1 |
| 2015/0279555 A1 | 10/2015 | Chiyo et al. |
| 2015/0279556 A1 | 10/2015 | Chiyo et al. |

FOREIGN PATENT DOCUMENTS

| | | | |
|---|---|---|---|
| JP | 2010-172084 A | | 8/2010 |
| JP | 2012-151311 A | | 8/2012 |
| JP | 2013-207479 | * | 10/2013 |
| JP | 2013-207479 A | | 10/2013 |
| JP | 2014-233187 A | | 12/2014 |
| WO | 2011/147451 A2 | | 12/2011 |

OTHER PUBLICATIONS

Jul. 31, 2015 Extended Search Report issued in European Patent Application No. 15160586.2.

Oct. 6, 2017 Office Action issued in U.S. Appl. No. 14/661,675.

* cited by examiner

COIL UNIT AND WIRELESS POWER TRANSMISSION DEVICE

BACKGROUND OF THE INVENTION

1. Field of the Invention

The present invention relates to a coil unit and a wireless power transmission device.

2. Description of the Related Art

Recently, in order to transmit power without mechanical contact by a cable or the like, a wireless power transmission technique using electromagnetic induction operation between a primary (transmission) coil and a secondary (power receiving) coil which face each other has attracted attention, and is expected to be widely used as a power feeding device for charging a secondary battery mounted in an electric vehicle (EV) or a plug-in hybrid electric vehicle (PHEV).

In a case in which a wireless power transmission technique is applied to a power feeding device for an electric vehicle or the like, it is assumed that a positional relationship between a transmission coil provided on the ground and a power receiving coil mounted in an electric vehicle or the like is not necessarily constant. In this way, in a case in which the positions of the transmission coil and the power receiving coil are shifted, magnetic coupling between the coils is significantly reduced, and as a result, there is a problem in which power transmission efficiency is reduced.

In Japanese Unexamined Patent Application Publication No. 2010-172084, a technique of a non-contact power feeding device using a plurality of cores disposed at predetermined intervals on a flat surface has been proposed. Japanese Unexamined Patent Application Publication No. 2010-172084 discloses that the non-contact power feeding device is resistant to a positional shift since the plurality of cores operate as cores with sizes expanded by including a gap therebetween.

In the technique disclosed in Japanese Unexamined Patent Application Publication No. 2010-172084, the plurality of cores are disposed at predetermined intervals on a flat surface, each core using a coil in which a winding wire is wound in a helical shape, and thus power transmission efficiency can be increased. However, in a case of the coil in which a winding wire is wound in a helical shape into the cores, since a magnetic flux which is circulated up to a place separated from the coil is easily generated, there is a problem that an unnecessary leakage magnetic field is easy to be formed in the place separated from the coil. Particularly, in a case in which a wireless power transmission technique is applied to a charging device for a power electronic device such as an electric vehicle, since it is necessary to make a large current flow through the coil because a large power transmission is required, there is a possibility that a leakage magnetic field strength formed in the place separated from the coil may also increase, and electromagnetic interference negatively affecting a peripheral electronic apparatus or the like may occur.

SUMMARY OF THE INVENTION

Accordingly, it is an object of the present invention to provide a coil unit and a wireless power transmission device in which a decrease of power transmission efficiency is suppressed and an unnecessary leakage magnetic field formed in a place separated from the coil unit is reduced.

A coil unit according to the present invention, which wirelessly transmits power from a transmission side to a power receiving side, includes: first and second coils in which directions of magnetic fields generated when a current flows are reversed to each other, and are apposed; a non-magnetic conductive plate which is disposed along an arrangement direction of the first and second coils; and a magnetic body. The magnetic body includes a first portion which is positioned in an outer side than an outline of one side of the conductive plate in the arrangement direction of the first and second coils, and a second portion which is positioned in an outer side than an outline of the other side of the conductive plate in the arrangement direction of the first and second coils. When viewing from the arrangement direction of the first and second coils, the first and second portions are positioned on a side of the conductive plate where is opposite to a side which faces the first and second coils.

According to the present invention, since the magnetic body includes the first portion which is positioned in the outer side than the outline of one side of the conductive plate in the arrangement direction of the first and second coils, and the second portion which is positioned in the outer side than the outline of the other side of the conductive plate in the arrangement direction of the first and second coils, a magnetic path with a low magnetoresistance is formed. That is, a magnetoresistance of a magnetic path which passes through the magnetic body is smaller than a magnetoresistance of a magnetic path which is widely circulated up to a place separated from the coil unit. Thus, the magnetic flux easily forms the magnetic path which passes through the magnetic body, and the magnetic flux hardly forms the magnetic path which is widely circulated up to a place separated from the coil unit. As a result, since magnetic flux density of a place separated from the coil unit is decreased, a strength of an unnecessary leakage magnetic field which is formed in a place separated from the coil unit is decreased. Furthermore, since magnetic coupling of the coils and the magnetic body is prevented from excessively increasing by the non-magnetic conductive plate which is disposed in the arrangement direction of the first and second coils, magnetic coupling of a transmission side and a power receiving side in the wireless power transmission can be prevented from significantly decreasing. As a result, a decrease of power transmission efficiency is suppressed.

It is preferable that the magnetic body further include a third portion which is positioned between the first portion and the second portion, and imaginary component values of permeability of the first and second portions be smaller than an imaginary component value of permeability of the third portion. That is, since the first and second portions of the magnetic body have small imaginary component values of permeability, loss and heat generation in the first and second portions are small, even in a case in which magnetic flux density of the first and second portions is high. Thus, even if a position of the coil unit is shifted and the magnetic flux density of the first or second portion which is positioned in an outer side than an outline of the conductive plate is locally increased, the loss and heat generation in the first and second portions can be reduced.

It is preferable that the coil unit further include a magnetic core which is disposed along the arrangement direction of the first and second coils and between the first and second coils and the conductive plate. In this case, inductances of the first and second coils increase, and magnetic coupling of the first coil and the second coil also increase. As a result, power transmission efficiency can be increased.

A wireless power transmission device according to the present invention, which wirelessly transmits power by a transmission coil unit and a power receiving coil unit facing each other, includes: first and second transmission coils in which directions of magnetic fields generated when a current flows are reversed to each other, and are apposed; the transmission coil unit that includes a magnetic core which is disposed along an arrangement direction of the first and second transmission coils; and the power receiving coil unit which is configured with the above-described coil unit. When viewing from a facing direction of the transmission coil unit and the power receiving coil unit, an outline of the conductive plate of the power receiving coil unit is positioned in an outer side than an outline of the magnetic core of the transmission coil unit.

According to the present invention, magnetic coupling of the first and second transmission coils and the magnetic body is more effectively prevented from excessively increasing by the conductive plate, and among the magnetic fluxes which are generated by the first and second transmission coils, the magnetic flux which is not interlinked with the power receiving coil selectively forms a magnetic path which passes through the magnetic body. As a result, a decrease of power transmission efficiency is suppressed, and an effect in which a leakage magnetic field is reduced is increased even more.

A wireless power transmission device according to the present invention, which wirelessly transmits power by a transmission coil and a power receiving coil unit facing each other, includes: the transmission coil in which a winding wire is wound on a magnetic core; and the power receiving coil unit which is configured with the above-described coil unit. When viewing from a facing direction of the transmission coil and the power receiving coil unit, an outline of the conductive plate of the power receiving coil unit is positioned in an outer side than an outline of the magnetic core.

According to the present invention, magnetic coupling of the transmission coils and the magnetic body is more effectively prevented from excessively increasing by the conductive plate, and among the magnetic fluxes which are generated by the transmission coils, the magnetic flux which is not interlinked with the power receiving coil selectively forms a magnetic path which passes through the magnetic body. As a result, a decrease of power transmission efficiency is suppressed, and an effect in which a leakage magnetic field is reduced is increased even more.

A wireless power transmission device according to the present invention, which wirelessly transmits power by a transmission coil unit and a power receiving coil facing each other: the transmission coil unit which is configured with the above-described coil unit; and the power receiving coil. The coil of the transmission coil unit includes a magnetic core. When viewing from a facing direction of the transmission coil unit and the power receiving coil, an outline of the conductive plate of the transmission coil unit is positioned in an outer side than an outline of the magnetic core.

According to the present invention, magnetic coupling of the coils included in the transmission coil unit and the magnetic body is more effectively prevented from excessively increasing by the conductive plate, and among the magnetic fluxes which are generated by the coils included in the transmission coil unit, the magnetic flux which is not interlinked with the power receiving coil selectively forms a magnetic path which passes through the magnetic body. As a result, a decrease of power transmission efficiency is suppressed, and an effect in which a leakage magnetic field is reduced is increased even more.

As described above, according to the present invention, it is possible to suppress a decrease of power transmission efficiency, and to reduce an unnecessary leakage magnetic field which is formed in a place separated from the coil unit.

DESCRIPTION OF THE PREFERRED EMBODIMENTS

Figure 1:
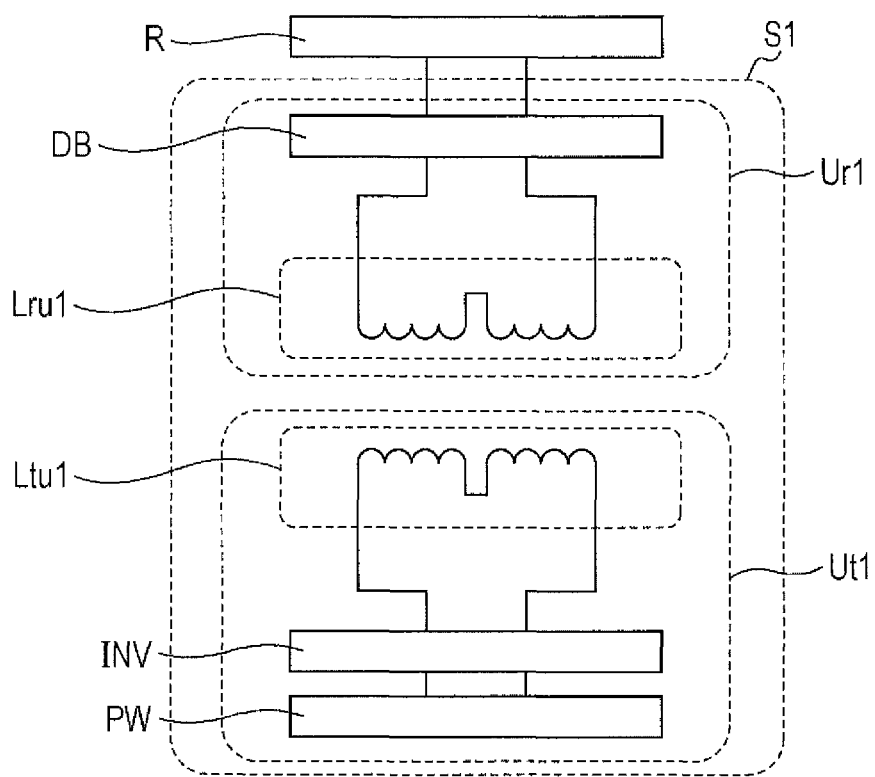
FIG. 1 is a system configuration diagram illustrating, with a load, a wireless power transmission device to which a coil unit according to a first embodiment of the present invention is applied.

Embodiments for executing the present invention will be described in detail with reference to the drawings. In the description, the same symbols or reference numerals will be attached to the same elements or the elements having the same functions, and repeated description will be omitted.

First Embodiment

Figure 2:
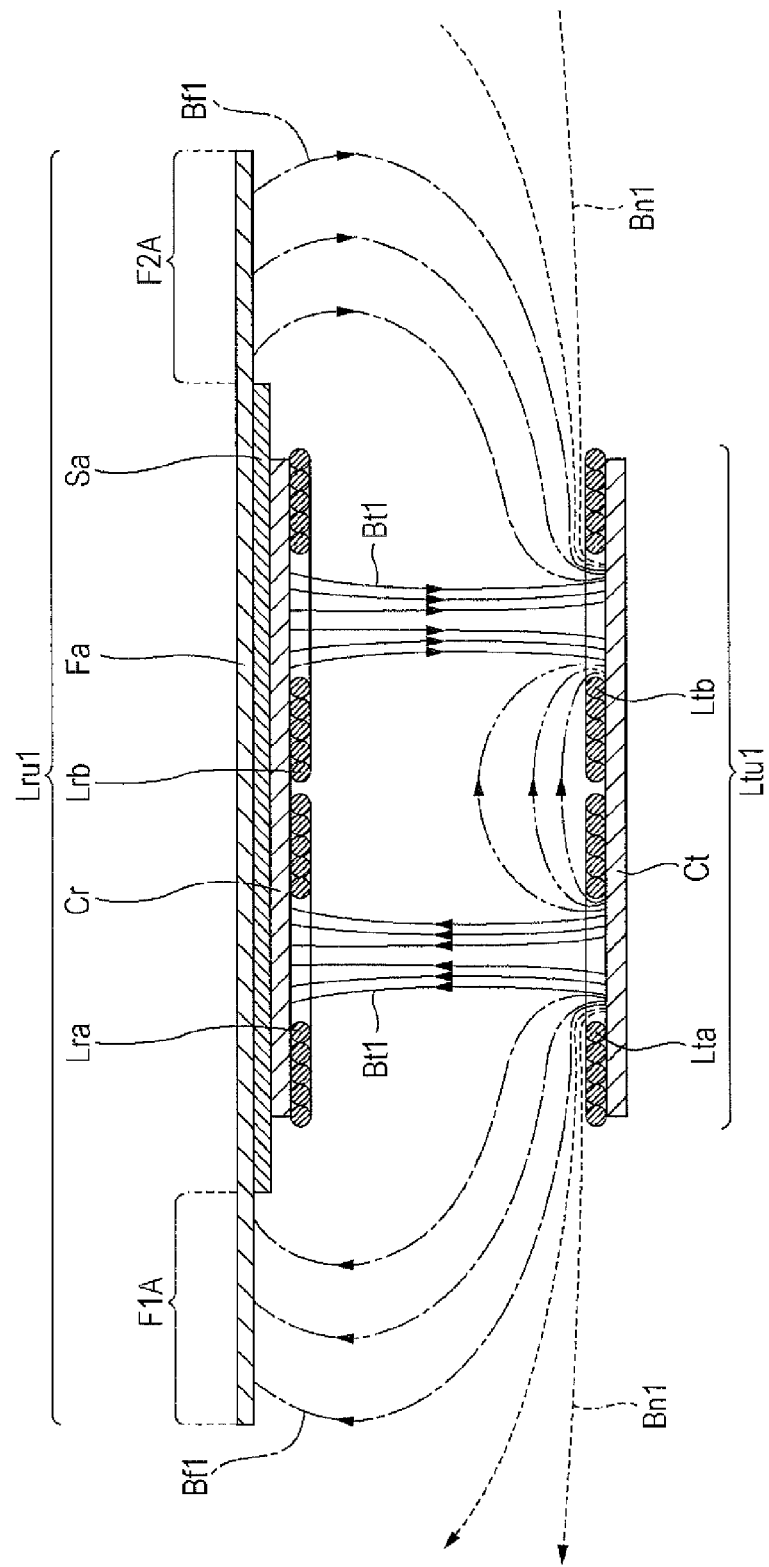
FIG. 2 is a diagram schematically illustrating a magnetic flux which is generated by a transmission coil, in a cross-sectional diagram illustrating a power receiving coil unit according to the first embodiment of the present invention and a transmission coil unit.

An entire configuration of a wireless power transmission device S1 according to a first embodiment of the present invention will be first described with reference to FIG. 1 and FIG. 2. In the present embodiment, an example in which a coil unit according to the present invention is applied to a power receiving coil unit of the wireless power transmission device is described. FIG. 1 is a system configuration diagram illustrating the wireless power transmission device according to the first embodiment of the present invention, and a load. FIG. 2 is a schematic cross-sectional diagram illustrating a transmission coil unit and a power receiving coil unit in the wireless power transmission device, according to the first embodiment of the present invention. FIG. 2 schematically illustrates magnetic fluxes which are generated by first and second transmission coils Lta and Ltb. In FIG. 2, magnetic fluxes in the inside of magnetic cores Ct and Cr of a transmission coil unit Ltu1 and a power receiving coil unit Lru1, and a magnetic flux which is generated by the inside of magnetic body Fa are not illustrated. In addition, in FIG. 2, as representations of the magnetic fluxes which are generated by the first and second transmission coils Lta and Ltb, a magnetic flux Bt1 which is interlinked with first and second power receiving coils Lra and Lrb, a magnetic flux Bn1 which is widely circulated up to a place separated from the power receiving coil unit Lru1, and a magnetic flux Bf1 which passes through the magnetic body Fa are illustrated.

As illustrated in FIG. 1, the wireless power transmission device S1 includes a wireless transmission device Ut1 and a wireless power receiving device Ur1.

The wireless transmission device Ut1 includes a power supply PW, an inverter INV, and the transmission coil unit Ltu1. The wireless power receiving device Ur1 includes the power receiving coil unit Lru1 and a rectification circuit DB.

A configuration of the wireless transmission device Ut1 will be first described. The power supply FW supplies the inverter INV with DC power. As the power supply PW, all kinds of devices which output DC power can be used, and a DC power supply which rectifies commercial AC power and smoothes the rectified power, a secondary battery, a DC power supply which generates power from solar light, a switching power supply device such as a switching converter, or the like can be used.

The inverter INV has a function of converting an input DC power which is supplied from the power supply PW into AC power. In the present embodiment, the inverter INV converts the input DC power which is supplied from the power supply PW into AC power and supplies the first and second transmission coils Lta and Ltb with the AC power. The inverter INV is configured by a switching circuit in which a plurality of switching elements is bridge-connected. As the switching element which configures the switching circuit, an element, such as, a metal oxide semiconductor field effect transistor (MOSFET), or an insulated gate bipolar transistor (IGBT) can be used.

As illustrated in FIG. 2, the transmission coil unit Ltu1 includes the first and second transmission coils Lta and Ltb, and the magnetic core Ct. The first and second transmission coils Lta and Ltb are juxtaposed on the same plane, and axes of the first and second transmission coils Lta and Ltb are both configured in parallel to each other in a facing direction to the transmission coil unit Ltu1 and the power receiving coil unit Lru1. In the present embodiment, the first and second transmission coils Lta and Ltb are formed by a winding wire which is configured by a litz wire such as copper or aluminum and is wound in a planar shape. The number of turns of the first and second transmission coils Lta and Ltb is appropriately set based on a distance between the power receiving coil unit Lru1 and the first and second transmission coils Lta and Ltb, a desired power transmission efficiency, or the like. In a case in which the wireless power transmission device S1 according to the present embodiment is applied to a power feeding facility to a vehicle such as an electric vehicle, the transmission coil unit Ltu1 is disposed in the ground or near the ground, and by disposing the first and second transmission coils Lta and Ltb so as to face the power receiving coil unit Lru1, power is wirelessly transmitted.

In addition, directions of magnetic field which is generated when a current flows through the first transmission coil Lta and the second transmission coil Ltb, are reversed to each other, and in the present embodiment, the first transmission coil Lta and the second transmission coil Ltb are electrically connected in series to each other. That is, in a case in which winding directions of the first transmission coil Lta and the second transmission coil Ltb are the same, a direction of a current flowing through the first transmission coil Lta may be reversed to a direction of a current flowing through the second transmission coil Ltb. Alternatively, in a case in which a winding direction of the first transmission coil Lta is reverse to a winding direction of the second transmission coil Ltb, the direction of the current flowing through the first transmission coil Lta may be the same as the direction of the current flowing through the second transmission coil Ltb. By doing this, the directions of the magnetic fields generated are reversed to each other, and thus, by the magnetic fields generated in each coil, magnetic path which is interlinked with both the transmission coils Lta and Ltb is efficiently formed, and power transmission efficiency is increased.

The magnetic core Ct is disposed along a side of the first and second transmission coils Lta and Ltb opposite to a side which faces the power receiving coil unit Lru1. The magnetic core Ct is configured by a material with a relatively high relative permeability such as a ferrite. By the magnetic core Ct, inductances of the first and second transmission coils Lta and Ltb are increased, magnetic coupling of the first transmission coil Lta and the second transmission coil Ltb is increased, and thus an efficient magnetic flux can be generated. In the present embodiment, the magnetic core Ct is in a plate shape, but may have two protrusion portions protruded toward the central portion of each of the first and second transmission coils Lta and Ltb. In this case, the inductances of the first and second transmission coils Lta and Ltb are further increased by the magnetic core Ct.

Next, a configuration of the wireless power receiving device Ur1 will be described. The power receiving coil unit Lru1 has a function of receiving AC power which is transmitted from a transmission coil Lt. In a case in which the wireless power transmission device S1 according to the present embodiment is applied to a power feeding facility to a vehicle such as an electric vehicle, the power receiving coil unit Lru1 is mounted on a lower portion of the vehicle. The power receiving coil unit Lru1 includes the first and second power receiving coils Lra and Lrb, a magnetic core Cr, a conductive plate Sa, and the magnetic body Fa.

As illustrated in FIG. 2, the first and second power receiving coils Lra and Lrb are juxtaposed on the same plane, and axes of the first and second power receiving coils Lra and Lrb are both configured in parallel in a facing direction of the transmission coil unit Ltu1 and the power receiving coil unit Lru1. In the present embodiment, the first and second power receiving coils Lra and Lrb are formed by a winding wire which is configured by a litz wire such as copper or aluminum and is wound in a planar shape. The number of turns of the first and second power receiving coils Lra and Lrb is appropriately set based on a distance between the transmission coil unit Ltu1 and the first and second power receiving coils Lra and Lrb, a desired power transmission efficiency, or the like.

In addition, directions of magnetic field generated when a current flows through the first power receiving coil Lra and the second power receiving coil Lrb, are reversed to each other, and in the present embodiment, the first power receiving coil Lra and the second power receiving coil Lrb are electrically connected in series to each other. That is, in a case in which winding directions of the first power receiving coil Lra and the second power receiving coil Lrb are the same, a direction of a current flowing through the first power receiving coil Lra may be reverse to a direction of a current flowing through the second power receiving coil Lrb. Alternatively, in a case in which a winding direction of the first power receiving coil Lra is reverse to a winding direction of the second power receiving coil Lrb, the direction of the current flowing through the first power receiving coil Lra may be the same as the direction of the current flowing through the second power receiving coil Lrb. By this configuration, a phase of a current of the first power receiving coil Lra and a phase of a current of the second power receiving coil Lrb, which are generated by a magnetic flux which is interlinked with both the first and second power receiving coils Lra and Lrb, are matched, and thus power can be efficiently transmitted.

The magnetic core Cr is disposed in an arrangement direction of the first and second power receiving coils Lra and Lrb between the first and second power receiving coils Lra and Lab, and the conductive plate Sa which will be described later. The magnetic core Cr is configured by a material with a relatively high relative permeability such as a ferrite. By the magnetic core Cr, inductances of the first and second power receiving coils Lra and Lrb are increased, magnetic coupling of the first power receiving coil Lra and the second power receiving coil Lab is increased, and thus an efficient magnetic flux can be generated. As a result, power transmission efficiency can be increased. In the present embodiment, the magnetic core Cr is in a plate shape, but may have two protrusion portions protruded toward the central portion of each of the first and second power receiving coils Lra and Lrb. In this case, the inductances of the first and second power receiving coils Lra and Lab are further increased by the magnetic core Cr.

The conductive plate Sa is disposed in an arrangement direction of the first and second power receiving coils Lra and Lrb. In the present embodiment, the conductive plate Sa is disposed in parallel to the magnetic core Cr, along a surface on a side of the magnetic core Cr opposite to a surface which faces the first and second power receiving coils Lra and Lrb. The conductive plate Sa functions as an electromagnetic shield material for preventing magnetic coupling of the first and second transmission coils Lta and Ltb or the first and second power receiving coils Lra and Lrb, and the magnetic body Fa which will be described later from being excessively increased. Specifically, the conductive plate Sa functions as a shield material which reduces passage of a magnetic flux by cancelling a magnetic field using an induced current, an eddy current, or the like. Thus, as a conductive plate Sa, all kinds of non-magnetic conductors, the surfaces of which function as electromagnetic shield materials can be used, and aluminum, copper, a steel plate, the surface of which is plated by zinc, or the like can be used. In the present embodiment, in a case in which a center point of the transmission coil unit Ltu1 overlaps a center point of the power receiving coil unit Lru1 when viewing from a facing direction of the transmission coil unit Ltu1 and the power receiving coil unit Lru1, an outline of the conductive plate Sa of the power receiving coil unit Lru1 is positioned in an outer side than the outline of the magnetic core Ct of the transmission coil unit Ltu1. For this reason, the magnetic coupling of the first and second transmission coils Lta, and Ltb and the magnetic body Fa which will be described later can be effectively prevented from excessively increasing by the conductive plate Sa. Also, among the magnetic fluxes which are generated by the first and second transmission coils Lta and Ltb, the magnetic flux which is not interlinked with the first and second power receiving coils Lra and Lrb selectively forms a magnetic path which passes though the magnetic body Fa which will be described. As a result, a decrease of power transmission efficiency is suppressed, and an effect in which a leakage magnetic field is reduced is increased even more.

The magnetic body Fa is disposed along a surface of the conductive plate Sa opposite to a surface which faces the first and second power receiving coils Lra and Lrb. That is, when viewing the power receiving coil unit Lru1 from an arrangement direction of the first and second power receiving coils Lra and Lrb, the first and second power receiving coils Lra and Lrb, the magnetic core Cr, the conductive plate Sa, and the magnetic body Fa are sequentially disposed.

Since forming a magnetic circuit with a low magnetoresistance, the magnetic body Fa is configured by a material with a high relative permeability. Specifically, if the relative permeability of the magnetic body Fa is greater than 1, a magnetoresistance ratio of the magnetic body Fa is lower than that of a surrounding space, and thus when the magnetic body Fa forms a magnetic circuit with a low magnetoresistance, an effect in which a leakage magnetic field is reduced is obtained. In the present embodiment, in order to effectively decrease the leakage magnetic field, the magnetic body Fa is configured by a material with a relatively high relative permeability such as iron or a ferrite. In the present embodiment, the magnetic body Fa is configured by one plate, but the present invention is not limited to this. For example, multiple plates may be disposed so as to be separated from each other.

In all cases, a magnetic circuit with a low magnetoresistance can be formed by the magnetic body Fa. Furthermore, the magnetic body Fa may be used instead of a vehicle configuration components positioning near a lower portion of a vehicle, which are configured by a magnetic body.

In addition, the magnetic body Fa includes a first portion F1A which is positioned in an outer side than the outline of one side of the conductive plate Se in an arrangement direction of the first and second power receiving coils Lra and Lrb, and is positioned on a side of the conductive plate Sa opposite to a side which faces the first and second power receiving coils Lra and Lrb, when viewing from an arrangement direction of the first and second power receiving coils Lra and Lrb. That is, the magnetic body Fa protrudes toward an outer side (left side in the figure) than an outline (left end in the figure) of one side of the conductive plate Sa in an arrangement direction of the first and second power receiving coils lira and Lrb.

Furthermore, the magnetic body Fa includes a second portion F2A which is positioned in an outer side than the outline of the other side of the conductive plate Sa in an arrangement direction of the first and second power receiving coils Lra and Lrb, and is positioned on a side of the conductive plate Sa opposite to a side which faces the first and second power receiving coils Lra and Lrb, when viewing from an arrangement direction of the first and second power receiving coils Lra and Lrb. That is, the magnetic body Fa protrudes toward an outer side (right side in the figure) than an outline (right end in the figure) of the other side of the conductive plate Sa in an arrangement direction of the first and second power receiving coils Lra and Lrb. The magnetic body Fa may or may not protrude toward an outer side than the outline of the conductive plate Sa, in a direction orthogonal to an arrangement direction of the first and second power receiving coils Lra and Lrb. In the present embodiment, a length of the conductive plate Sa and a length of the magnetic body Fa are approximately the same, in a direction orthogonal to an arrangement direction of the first and second power receiving coils Lra and Lrb.

The rectification circuit DB has a function of rectifying AC power that the first and second power receiving coils Lra and Lrb receive into DC power. As the rectification circuit DB, a conversion circuit which includes a full-wave rectification function using a diode bridges, and a power smoothing function using a capacitor and a three-terminal regulator, or the like is used. DC power which is rectified by the rectification circuit DB is output to a load R. Here, in a case in which the wireless power transmission device S1 according to the present embodiment is applied to a power feeding facility to a vehicle such as an electric vehicle, a secondary battery mounted in the vehicle is used as the load R.

Next, a magnetic flux which is generated by the first and second transmission coils Lta and Ltb according to the present embodiment, and a reduction effect of an unnecessary leakage magnetic field will be described in detail with reference to FIG. 2.

As illustrated in FIG. 2, the first and second transmission coils Lta and Ltb generate the magnetic flux Bt1 which is interlinked with the first and second power receiving coils Lra and Lrb. Since the magnetic flux Bt1 is interlinked with the first and second power receiving coils Lra and Lrb, an electromotive force is generated in the first and second power receiving coils Lra and Lrb. Then, the power which is generated in the first and second power receiving coils Lra and Lrb is rectified by the rectification circuit DB, and is output to the load R. Here, the present embodiment further includes the magnetic core Cr which is disposed in an arrangement direction of the first and second power receiving coils Lra and Lrb, between the first and second power receiving coils Lra and Lrb and the conductive plate Sa. Thus, magnetic coupling of the first power receiving coil Lra and the second power receiving coil Lrb is increased, and the magnetic flux Bt1 which is interlinked with the first and second power receiving coils Lra and Lrb more efficiently is generated. In addition, since inductances of the first and second power receiving coils Lra and Lrb are increased by the magnetic core Cr, the electromotive force more efficiently occurs in the first and second power receiving coils Lra and Lrb by the magnetic flux Bt1. As a result, power transmission efficiency is increased.

In addition, since the conductive plate Sa is disposed along a surface on a side of the first and second power receiving coils Lra and Lrb opposite to a surface which faces the transmission coil unit Ltu1, the magnetic flux Bt1 forms a magnetic path which passes through the magnetic body Fa, and thereby a decrease of the magnetic flux which is interlinked with the first and second power receiving coils Lra and Lrb is suppressed. That is, by the conductive plate Sa, magnetic coupling of the first and second transmission coils Lta and Ltb or the first and second power receiving coils Lra and Lrb, and the magnetic body Fa can be prevented from excessively increasing, and magnetic coupling of the first and second transmission coils Lta and Ltb and the first and second power receiving coils Lra and Lrb can be prevented from significantly decreasing. As a result, a decrease of power transmission efficiency is suppressed. Particularly, in the present embodiment, when viewing from a facing direction of the transmission coil unit Ltu1 and the power receiving coil unit Lru1, the outline of the conductive plate Sa is positioned in an outer side than the outline of the magnetic core Ct of the transmission coil unit Ltu1. Thus, by forming a magnetic path such that the magnetic flux Bt1 passes through the magnetic body Fa, a decrease of a magnetic flux which is interlinked with the first and second power receiving coils Lra and Lrb can be effectively suppressed. That is, by the conductive plate Sa, the magnetic coupling of the first and second transmission coils Lta and Ltb and the magnetic body Fa is prevented from excessively increasing.

Meanwhile, as illustrated in FIG. 2, the first and second transmission coils Lta and Ltb generate the magnetic flux Bn1 which is not interlinked with the first and second power receiving coils Lra and Lrb, and is widely circulated up to a place separated from the power receiving coil unit Lru1. The magnetic flux Bn1 which is widely circulated up to a place separated from the power receiving coil unit Lru1 forms an unnecessary leakage magnetic field in a place separated from the power receiving coil unit Lru1. In addition, the first and second transmission coils Lta and Ltb generate the magnetic flux Bf1 which is not interlinked with the first and second power receiving coils Lra and Lrb, and passes through the magnetic body Fa. Since circulating the periphery of the power receiving coil unit Lru1, the magnetic flux Bf1 which passes through the magnetic body F does not form a magnetic path which is circulated up to place separated from the power receiving coil unit Lru1.

Here, since a magnetoresistance ratio of the magnetic body Fa is lower than a magnetoresistance ratio of a surrounding space, a magnetoresistance of a magnetic path which passes through the magnetic body Fa is smaller than a magnetoresistance of a magnetic path which is widely circulated up to a place separated from the power receiving coil unit Lru1. Thus, the magnetic flux Bf1 which passes through the magnetic body Fa increases, and the magnetic flux Bn1 which is circulated up to a place separated from the power receiving coil unit Lru1 decreases. As a result, since the magnetic flux Bn1 which is widely circulated up to a place separated from the power receiving coil unit Lru1 decreases, magnetic flux density of a place separated from the power receiving coil unit Lru1 is decreased, and a strength of an unnecessary leakage magnetic field represented by a magnetic flux density of a place separated from the power receiving coil unit Lru1 is also decreased.

In addition, the first and second portions F1A and F2A of the magnetic body Fa are disposed so as to be positioned on the outside of both ends in an arrangement direction of the first and second power receiving coils Lra and Lrb of the conductive plate Sa, and thus, among the magnetic fluxes which are generated by the first and second transmission coils Lta and Ltb, the magnetic flux which is not interlinked with the first and second power receiving coils Lra and Lrb, more easily forms a magnetic path which passes through the magnetic body Fa. That is, the first and second portions F1A and F2A are disposed such that a magnetoresistance of the magnetic path formed by the magnetic body Fa is smaller. Thus, an unnecessary leakage magnetic field can be effectively reduced.

Furthermore, in the present embodiment, when viewing from a facing direction of the transmission coil unit Ltu1 and the power receiving coil unit Lru1, the outline of the conductive plate Sa is positioned in an outer side than the outline of the magnetic core Ct of the transmission coil unit Ltu1. Thus, it is possible to effectively prevent the magnetic flux Bt1 which is interlinked with the first and second power receiving coils Lra and Lrb from forming a magnetic path which passes through the magnetic body Fa, and a magnetic flux which is not interlinked with the first and second power receiving coils Lra and Lrb selectively forms a magnetic path which passes through the magnetic body Fa. As a result, a decrease of power transmission efficiency is suppressed, and an effect in which a leakage magnetic field is reduced is increased even more.

As described above, in the power receiving coil unit Lru1 according to the present embodiment, the magnetic body Fa includes the first portion F1A which is positioned in an outer side than the outline of one side of the conductive plate Sa in an arrangement direction of the first and second power receiving coils Lra and Lrb, and the second portion F2A which is positioned in an outer side than the outline of the other side of the conductive plate Sa in an arrangement direction of the first and second power receiving coils Lra and Lrb, and thereby a magnetic path with a low magnetoresistance is formed. That is, since the magnetoresistance of the magnetic path which passes through the magnetic body Fa is smaller than the magnetoresistance of the magnetic path which is widely circulated up to a place separated from the power receiving coil unit Lru1, the magnetic flux Bn1 which is widely circulated up to a place separated from the power receiving coil unit Lru1 decreases. As a result, the strength of an unnecessary leakage magnetic field which is formed in a place separated from the power receiving coil unit Lru1 is lowered. Furthermore, by the non-magnetic conductive plate Sa which is disposed in an arrangement direction of the first and second power receiving coils Lra and Lrb, magnetic coupling of the first and second transmission coils Lta and Ltb or the first and second power receiving coils Lra and Lrb and the magnetic body Fa can be prevented from excessively increasing, and thus magnetic coupling of the first and second transmission coils Lta and Ltb and the first and second power receiving coils Lra and Lrb can be prevented from significantly decreasing. As a result, a decrease of power transmission efficiency is suppressed.

In addition, in the present embodiment, the power receiving coil unit Lru1 further includes the magnetic core Cr which is disposed in an arrangement direction of the first and second power receiving coils Lra and Lrb, between the first and second power receiving coils Lra and Lrb and the conductive plate Sa. Thus, inductances of the first and second power receiving coils Lra and Lrb are increased, and magnetic coupling of the first power receiving coil Lra and the second power receiving coil Lrb is increased. As a result, power transmission efficiency is increased.

Furthermore, in the power receiving coil unit Lru1 according to the present embodiment, when viewing from a facing direction of the transmission coil unit Ltu1 and the power receiving coil unit Lru1, the outline of the conductive plate Se is positioned in an outer side than the outline of the magnetic core Ct of the transmission coil unit Ltu1. Thus, the magnetic coupling of the first and second transmission coils Lta and Ltb and the magnetic body Fa is effectively prevented from excessively increasing by the conductive plate Sa. Also, among the magnetic fluxes which are generated by the first and second transmission coils Lta and Ltb, the magnetic flux which is not interlinked with the first and second power receiving coils Lra and Lrb selectively forms a magnetic path which passes though the magnetic body Fa. As a result, a decrease of power transmission efficiency is suppressed, and an effect in which a leakage magnetic field is reduced is increased even more.

Second Embodiment

Figure 3:
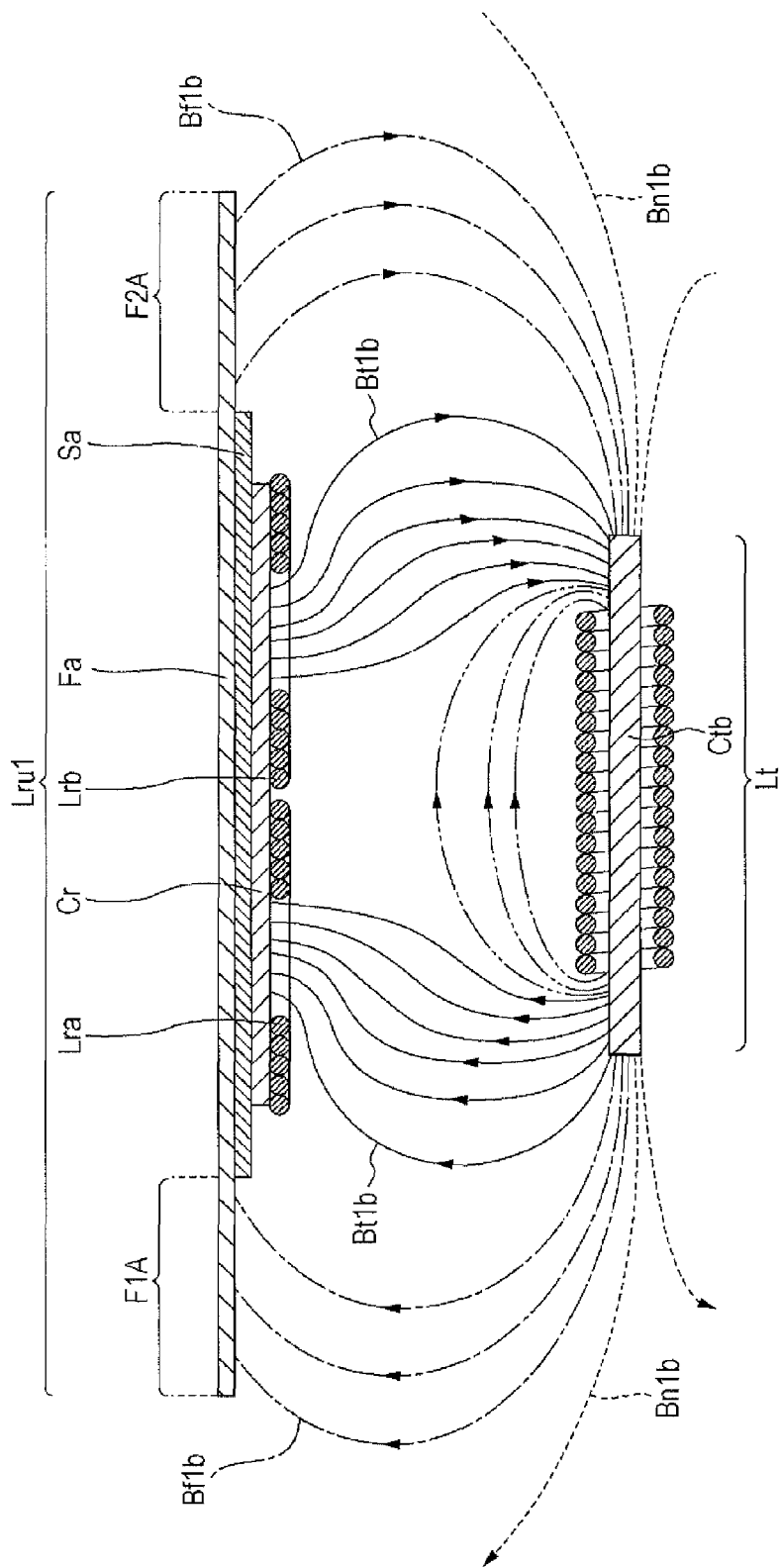
FIG. 3 is a diagram schematically illustrating a magnetic flux which is generated by a transmission coil, in a cross-sectional diagram illustrating a power receiving coil unit according to a second embodiment of the present invention and a transmission coil unit.

Next, the wireless power transmission device S1b according to a second embodiment of the present invention will be described with reference to FIG. 3. FIG. 3 is a diagram schematically illustrating a magnetic flux which is generated by a transmission coil, in a cross-sectional diagram illustrating a power receiving coil unit according to a second embodiment of the present invention and a transmission coil. However, the figure schematically illustrates a magnetic flux which is generated by the transmission coil Lt, and does not illustrate magnetic fluxes in the inside of magnetic cores Ctb and Cr of the transmission coil Lt and the power receiving coil unit Lru1, and the magnetic body Fa. In addition, in FIG. 3, as representations of the magnetic fluxes which are generated by the transmission coil Lt, a magnetic flux Bt1b which is interlinked with the first and second power receiving coils Lra and Lrb, a magnetic flux Bn1b which is widely circulated up to a place separated from the power receiving coil unit Lru1, and a magnetic flux Bf1b which passes through the magnetic body Fe are illustrated.

A wireless power transmission device S1b includes a wireless transmission device Ut1b, and a wireless power receiving device Ur1b. Furthermore, the wireless transmission device Ut1b includes, the power supply PW, the inverter INV, and the transmission coil Lt. In addition, the wireless power receiving device Ur1b includes the power receiving coil unit Lru1, and the rectification circuit DB.

Here, configurations of the power supply PW, the inverter INV, the power receiving coil unit Lru1, and the rectification circuit DB of the wireless power transmission device S1b are the same as those of the wireless power transmission device S1 according to the first embodiment. The wireless power transmission device S1b is different from the wireless power transmission device S1 in that the wireless power transmission device S1b includes the transmission coil Lt instead of the transmission coil unit Ltu1. Hereinafter, in the wireless power transmission device S1b, different portions from the wireless power transmission device S1 will be mainly described.

The transmission coil Lt is formed by winding a winding wire which is configured y a litz wire such as copper or aluminum on a magnetic core Ctb which is configured by a material with a relatively high relative permeability, such as a ferrite. An axis direction of the transmission coil Lt is orthogonal to a facing direction of the transmission coil Lt and the power receiving coil unit Lru1, and is parallel to an arrangement direction of the first and second power receiving coils Lra and Lrb which are included in the power receiving coil unit Lru1. The number of turns of the transmission coil Lt is appropriately set, based on a distance between the power receiving coil unit Lru1 and the transmission coil Lt, a desired power transmission efficiency, and the like. The transmission coil Lt is connected to the inverter INV, the transmission coil Lt faces the power receiving coil unit Lru1, and thus power is wirelessly transmitted.

In a case in which the center point of the transmission coil Lt overlaps the center point of the power receiving coil unit Lru1, when viewing from a facing direction of the transmission coil Lt and the power receiving coil Lru1, the outline of the magnetic core Ctb is positioned in an inner side than the outline of the conductive plate Sa of the power receiving coil unit Lru1. That is, when viewing from a facing direction of the transmission coil Lt and the power receiving coil Lru1, the outline of the conductive plate Sa of the power receiving coil unit Lru1 is positioned in an outer side than the outline of the magnetic core Ctb. For this reason, the magnetic coupling of the transmission coil Lt and the magnetic body Fa is effectively prevented from excessively increasing by the conductive plate Sa. Also, among the magnetic fluxes which are generated by the transmission coil Lt, the magnetic flux which is not interlinked with the first and second power receiving coils Lra and Lrb selectively forms a magnetic path which passes though the magnetic body Fa. As a result, a decrease of power transmission efficiency is suppressed, and an effect in which a leakage magnetic field is reduced is increased even more.

Next, a magnetic flux which is generated by the transmission coil Lt and a reduction effect of an unnecessary leakage magnetic field will be described in detail with reference to FIG. 3.

As illustrated in FIG. 3, the transmission coil Lt generates the magnetic flux Bt1*b* which is interlinked with the first and second power receiving coils Lra and Lrb. Since the magnetic flux Bt1*b* is interlinked with the first and second power receiving coils Lra and Lrb, an electromotive force is generated in the first and second power receiving coils Lra and Lrb.

Meanwhile, as illustrated in FIG. 3, the transmission coil Lt generates the magnetic flux Bn1*b* which is not interlinked with the first and second power receiving coils Lra and Lrb and is widely circulated up to a place separated from the power receiving coil unit Lru1, and the magnetic flux Bf1*b* which is not interlinked with the first and second power receiving coils Lra and Lrb and passes through the magnetic body Fa. Here, since a magnetic path with a magnetoresistance lower than that of a surrounding space is formed by the magnetic body Fa with a higher permeability than that of the surrounding space, the magnetic flux Bn1*b* which is widely circulated up to a place separated from the power receiving coil unit Lru1 is reduced, an unnecessary leakage magnetic field which is formed in a place separated from the power receiving coil unit Lru1 can be reduced.

Here, in the power receiving coil unit Lru1, since the conductive plate Sa is installed along a surface on a side of the first and second power receiving coils Lra and Lrb opposite to a surface which faces the transmission coil Lt, the magnetic flux Bt1*b* forms a magnetic path which passes through the magnetic body Fa, and thereby a decrease of the magnetic flux which is interlinked with the first and second power receiving coils Lra and Lrb is suppressed. That is, by the conductive plate Sa, magnetic coupling of the transmission coil Lt or the first and second power receiving coils Lra and Lrb, and the magnetic body Fa can be prevented from excessively increasing, and magnetic coupling of the transmission coil Lt and the first and second power receiving coils Lra and Lrb can be prevented from significantly decreasing. As a result, a decrease of power transmission efficiency is suppressed.

Particularly, in the present embodiment, when viewing from a facing direction of the transmission coil Lt and the power receiving coil unit Lru1, the outline of the conductive plate Sa is positioned in an outer side than the outline of the magnetic core Ctb of the transmission coil Lt. Thus, by forming a magnetic path such that the magnetic flux Bt1*b* passes through the magnetic body Fa, a decrease of a magnetic flux which is interlinked with the first and second power receiving coils Lra and Lrb can be effectively suppressed. That is, by the conductive plate Sa, the magnetic coupling of the first and second transmission coil Lt and the magnetic body Fa is effectively prevented from excessively increasing.

As described above, in the power receiving coil unit Lru1 according to the present embodiment, when viewing from a facing direction of the transmission coil Lt and the first and second power receiving coils Lra and Lrb, the outline of the conductive plate Sa is positioned in an outer side than the outline of the magnetic core Ctb of the transmission coil Lt. Thus, magnetic coupling of the transmission coil Lt and the magnetic body Fa is prevented from excessively increasing by the conductive plate Sa. Also, among the magnetic fluxes which are generated by the transmission coil Lt, the magnetic flux which is not interlinked with the first and second power receiving coils Lra and Lrb selectively forms a magnetic path which passes through the magnetic body Fa. As a result, a decrease of power transmission efficiency is suppressed, and an effect in which a leakage magnetic field is reduced is increased even more.

Third Embodiment

Figure 4:
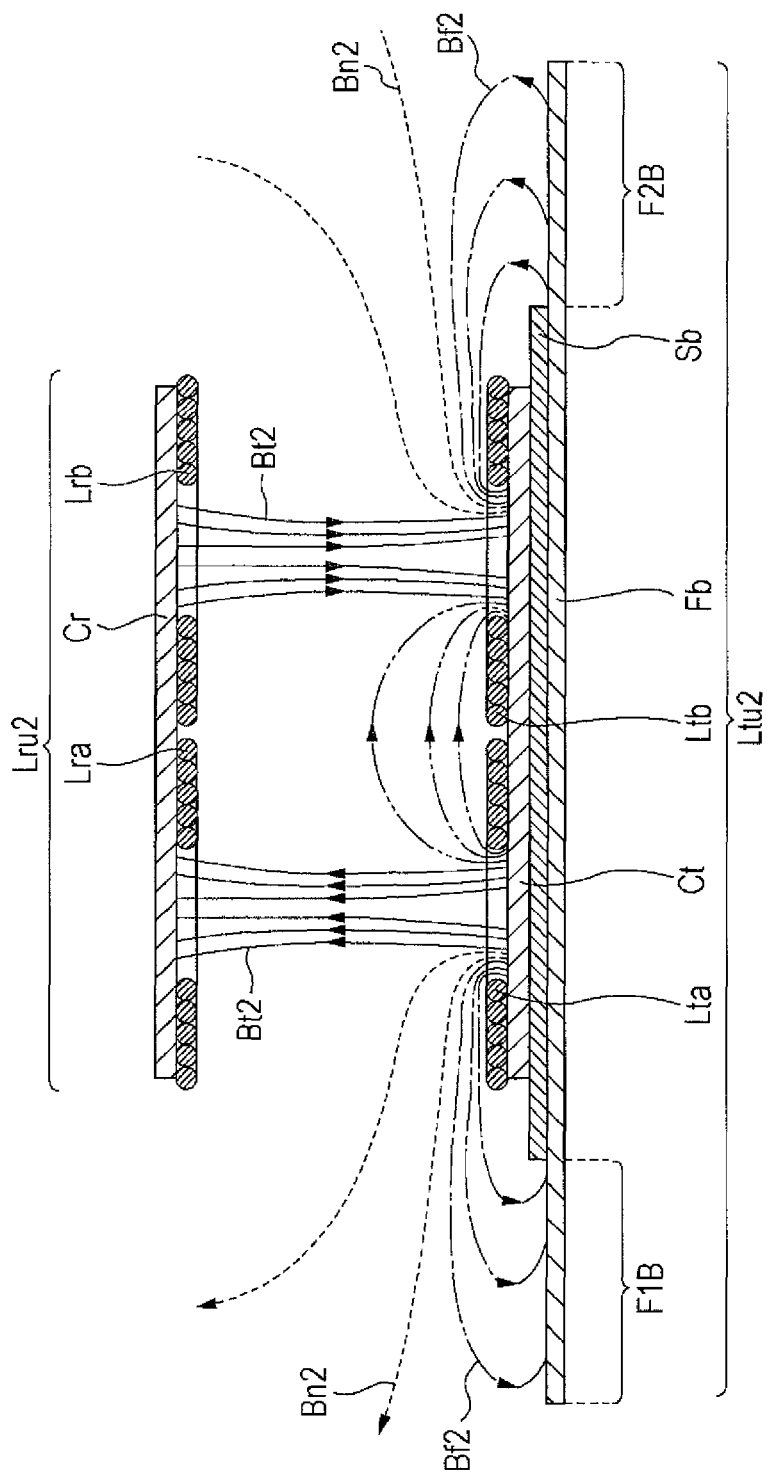
FIG. 4 is a diagram schematically illustrating a magnetic flux which is generated by a transmission coil, in a cross-sectional diagram illustrating a transmission coil unit according to a third embodiment of the present invention and a power receiving coil unit.

Next, a wireless power transmission device S2 according to a third embodiment of the present invention will be described with reference to FIG. 4. In the present embodiment, an example in which a coil unit according to the present invention is applied to a transmission coil unit of a wireless power transmission device will be described. FIG. 4 is a diagram schematically illustrating magnetic fluxes which are generated by the first and second transmission coils, in a cross-sectional diagram illustrating a transmission coil unit according to the third embodiment of the present invention and a power receiving coil unit. However, in the figure, magnetic fluxes in the magnetic cores Ct and Cr of the transmission coil unit Ltu2 and a power receiving coil unit Lru2, and a magnetic flux in the magnetic body Fb are not illustrated. In addition, in FIG. 4, as representations of the magnetic fluxes which are generated by first and second transmission coils Lta and Ltb, a magnetic flux Bt2 which is interlinked with the first and second power receiving coils Lra and Lrb, a magnetic flux Bn2 which is widely circulated up to a place separated from the transmission coil unit Ltu1, and a magnetic flux Bf2 which passes through the magnetic body Fb are illustrated.

The wireless power transmission device S2 includes a wireless transmission device Ut2 and a wireless power receiving device Ur2. The wireless transmission device Ut2 includes the power supply 1W, the inverter INV, and the transmission coil unit Ltu2. The wireless power receiving device Ur2 includes the power receiving coil unit Lru2 and the rectification circuit DB. Here, configurations of the power supply PW and the inverter INV and the rectification circuit DB are the same as those of the wireless power transmission device S1 according to the first embodiment. The wireless power transmission device S2 according to the third embodiment of the present invention is different from the wireless power transmission device S1 according to the first embodiment in that the wireless power transmission device S2 includes the transmission coil unit Ltu2 instead of the transmission coil unit Ltu1, and includes the power receiving coil unit Lru2 instead of the power receiving coil unit Lru1. In a configuration of the power receiving coil unit Lru2 according to the present embodiment, the conductive plate Sa and the magnetic body Fa are removed from the power receiving coil unit Lru1 according to the first embodiment. That is, the first and second power receiving coils Lra and Lrb which are included in the power receiving coil unit Lru2 face the transmission coil unit Ltu1. Hereinafter, the portions different from those of the first embodiment will be mainly described.

The configuration of the transmission coil unit Ltu2 will be first described. The transmission coil unit Ltu2 includes the first and second transmission coils Lta and Ltb, the magnetic core Ct, a conductive plate Sb, and a magnetic body Sb. Each configuration of the first and second transmission coils Lta and Ltb, the magnetic core Ct, the conductive plate Sb, and the magnetic body Fb is the same as each configuration of the first and second transmission coils Lta and Ltb of the wireless power transmission device Ut1 which is included in the wireless power transmission device S1 according to the first embodiment, the magnetic core Ct, the conductive plate Sa which is included in the power receiving coil unit Lru1 according to the first embodiment, and the magnetic body Fa.

The conductive plate Sb is disposed in an arrangement direction of the first and second transmission coils Lta and Ltb. Specifically, the conductive plate Sb is disposed along a surface on a side of the magnetic core Ct opposite to a surface which faces the first and second transmission coils Lta and Ltb. That is, the conductive plate Sb is disposed in a state in which the magnetic core Ct is interposed between the first and second transmission coils Lta and Ltb and the conductive plate Sb. When the conductive plate Sb is viewed from a facing direction of the transmission coil unit Ltu2 and the power receiving coil unit Lru2, an outline of the conductive plate Sb is positioned in an outer side than an outline of the magnetic core Ct of the transmission coil unit Ltu2. For this reason, magnetic coupling of the first and second transmission coils Lta and Ltb and the magnetic body Fb is effectively prevented from excessively increasing by the conductive plate Sb. Also, among the magnetic fluxes which are generated by the first and second transmission coils Lta and Ltb, the magnetic flux which is not interlinked with the first and second power receiving coils Lra and Lrb selectively forms a magnetic path which passes though the magnetic body Fb. As a result, a decrease of power transmission efficiency is suppressed, and an effect in which a leakage magnetic field is reduced is increased even more.

The magnetic body Fb is disposed along a surface of the conductive plate Sb opposite to a surface which faces the first and second transmission coils Lta and Ltb. That is, when the transmission coil unit Ltu1 is viewed from an arrangement direction of the first and second transmission coils Lta and Ltb, the first and second transmission coils Lta and Ltb, the magnetic core Ct, the conductive plate Sb, and the magnetic body Fb are sequentially disposed. In addition, when the transmission coil unit Ltu2 is viewed from the power receiving coil unit Lru2, the magnetic body Fb protrudes toward both outer sides than the outline of the conductive plate Sb in an arrangement direction of the first and second transmission coils Lta and Ltb. Since forming a magnetic circuit with a low magnetoresistance, the magnetic body Fb is configured by a material with relatively high relative permeability, such as, iron or a ferrite. In the present embodiment, the magnetic body Fb is configured by one plate, but the invention is not limited to this. For example, multiple plates may be disposed so as to be separated from each other. In all cases, a magnetic circuit with a high magnetoresistance can be formed by the magnetic body Fb.

In addition, the magnetic body Fb is positioned in an outer side than an outline of one side of the conductive plate Sb in an arrangement direction of the first and second transmission coils Lta and Ltb. When viewing from an arrangement direction of the first and second transmission coils Lta and Ltb, the magnetic body Fb includes a first portion F1B which is positioned on a side of the conductive plate Sb opposite to a side which faces the first and second transmission coils Lta and Ltb. That is, the magnetic body Fb protrudes toward an outer side (left side in the figure) than an outline (left end in the figure) of one side of the conductive plate Sb in an arrangement direction of the first and second transmission coils Lta and Ltb. In a direction orthogonal to an arrangement direction of the first and second transmission coils Lta and Ltb, the magnetic body Fb may or may not protrude toward an outer side than the outline of the conductive plate Sb. In the present embodiment, a length of the conductive plate Sb and a length of the magnetic body Fb are approximately the same, in a direction orthogonal to an arrangement direction of the first and second transmission coils Lta and Ltb.

Furthermore, the magnetic body Fb is positioned in an outer side than an outline of the other side of the conductive plate Sb in an arrangement direction of the first and second transmission coils Lta and Ltb. When viewing from an arrangement direction of the first and second transmission coils Lta and Ltb, the magnetic body Fb includes a second portion F2B which is positioned on a side of the conductive plate Sb opposite to a side which faces the first and second transmission coils Lta and Ltb. That is, the magnetic body Fb protrudes toward an outer side (right side in the figure) than an outline (right end in the figure) of the other side of the conductive plate Sb in an arrangement direction of the first and second transmission coils Lta and Ltb.

Next, the magnetic flux which is generated by the first and second transmission coils Lta and Ltb according to the present embodiment, and a reduction effect of an unnecessary leakage magnetic field will be described in detail with reference to FIG. 4.

As illustrated in FIG. 4, the first and second transmission coils Lta and Ltb generate magnetic fluxes Bt2 which are interlinked with the first and second power receiving coils Lra and Lrb. Since the magnetic fluxes Bt2 are interlinked with the first and second power receiving coils Lra and Lrb, an electromotive force occurs in the first and second power receiving coils Lra and Lrb. Then, power generated by the first and second power receiving coils Lra and Lrb is rectified by the rectification circuit DB and is output to a load R. Here, in the present embodiment, the magnetic core Ct disposed in an arrangement direction of the first and second transmission coils Lta and Ltb is further included between the first and second transmission coils Lta and Ltb and the conductive plate Sb. Thus, since inductances of the first and second transmission coils Lta and Ltb are increased and magnetic coupling of the first transmission coil Lta and the second transmission coil Ltb is increased, the magnetic flux Bt2 can be efficiently generated. As a result, power transmission efficiency is increased.

In addition, since the conductive plate Sb is installed along a surface on a side of the first and second transmission coils Lta and Ltb opposite to a surface which faces the power receiving coil unit Lru2, the magnetic flux Bt2 forms a magnetic path which passes through the magnetic body Fb, and thereby reduction of a magnetic flux which is interlinked with the first and second power receiving coils Lra and Lrb is suppressed. That is, by the conductive plate Sb, magnetic coupling of the first and second transmission coils Lta and Ltb and the magnetic body Fb can be prevented from excessively increasing, and magnetic coupling of the first and second transmission coils Lta and Ltb and the first and second power receiving coils Lra and Lrb can be prevented from significantly decreasing. As a result, a decrease of power transmission efficiency is suppressed. Particularly, in the present embodiment, when viewing from a facing direction of the transmission coil unit Ltu2 and the power receiving coil unit Lru2, the outline of the conductive plate Sb is positioned in an outer side than the outline of the magnetic core Ct of the transmission coil unit Ltu2. Thus, by forming a magnetic path such that the magnetic flux Bt2 passes through the magnetic body Fb, a decrease of a magnetic flux which is interlinked with the first and second power receiving coils Lra and Lrb can be effectively suppressed. That is, by the conductive plate Sb, the magnetic coupling of the first and second transmission coils Lta and Ltb and the magnetic body Fb is excessively prevented from excessively increasing.

Meanwhile, as illustrated in FIG. 4, the first and second transmission coils Lta and Ltb generate the magnetic flux Bn2 which is not interlinked with the first and second power receiving coils Lra and Lrb, and is widely circulated up to a place separated from the transmission coil unit Ltu2. The magnetic flux Bn2 which is widely circulated up to a place separated from the transmission coil unit Ltu2 forms an unnecessary leakage magnetic field in a place separated from the transmission coil unit Ltu2. In addition, the first and second transmission coils Lta and Ltb generate the magnetic flux Bf2 which is not interlinked with the first and second power receiving coils Lra and Lrb, and passes through the magnetic body Fb. Since circulating the periphery of the transmission coil unit Ltu2, the magnetic flux Bf2 which passes through the magnetic body Fb does not form a magnetic path which is circulated up to place separated from the transmission coil unit Ltu2.

Here, in the transmission coil unit Ltu2, a magnetic path having a magnetoresistance lower than that of the surrounding space is formed by the magnetic body Fb having permeability higher than that of a surrounding space, and thus, it is possible to reduce the magnetic flux Bn2 which widely circulates up to a place separated from the transmission coil unit Ltu2, and to reduce an unnecessary leakage magnetic field which is formed in a place separated from the transmission coil unit Ltu2. Furthermore, the first and second portions F1B and F2B of the magnetic body Fb is disposed so as to be positioned on the outside of both end of the conductive plate Sb, in an arrangement direction of the first and second transmission coils Lta and Ltb, and thus, a magnetoresistance of a magnetic path which is formed by the magnetic body Fb is further decreased, and it is possible to effectively reduce an unnecessary leakage magnetic field.

In addition, in the present embodiment, when the conductive plate Sb and the magnetic core Ct are viewed from a facing direction of the transmission coil unit Ltu2 and the power receiving coil unit Lru2, the outline of the conductive plate Sb is positioned in an outer side than the outline of the magnetic core Ct. Thus, it is possible to more effectively suppress that the magnetic flux Bt2 which is interlinked with the first and second power receiving coils Lra and Lrb forms a magnetic path which passes though the magnetic body Fb, and the magnetic flux which is not interlinked with the first and second power receiving coils Lra and Lrb selectively forms a magnetic path which passes though the magnetic body Fb. As a result, a decrease of power transmission efficiency is suppressed, and an effect in which a leakage magnetic field is reduced is increased even more.

As described above, in the transmission coil unit Ltu2 according to the present embodiment, the magnetic body Fb includes the first portion F1B which is positioned in an outer side than the outline of one side of the conductive plate Sb in an arrangement direction of the first and second transmission coils Lta and Ltb, and the second portion F2B which is positioned in an outer side than the outline of the other side of the conductive plate Sb in an axis direction of the transmission coil Lt, and thereby a magnetic path with a low magnetoresistance is formed. That is, since the magnetoresistance of the magnetic path which passes through the magnetic body Fb is smaller than the magnetoresistance of the magnetic path which is widely circulated up to a place separated from the transmission coil unit Ltu2, the magnetic flux Bn2 which is widely circulated up to a place separated from the transmission coil unit Ltu2 decreases. As a result, the strength of an unnecessary leakage magnetic field which is formed in a place separated from the transmission coil unit Ltu2 is lowered. Furthermore, by the non-magnetic conductive plate Sb which is disposed in an arrangement direction of the first and second transmission coils Lta and Ltb, magnetic coupling of the first and second transmission coils Lta and Ltb and the magnetic body Fb is prevented from excessively increasing, and thus magnetic coupling of the first and second transmission coils Lta and Ltb and the first and second power receiving coils Lra and Lrb can be prevented from significantly decreasing. As a result, a decrease of power transmission efficiency is suppressed.

In addition, in the transmission coil unit Ltu2 according to the present embodiment, the magnetic core Ct disposed in an arrangement direction of the first and second transmission coils Lta and Ltb is further included between the first and second transmission coils Lta and Ltb and the conductive plate Sb. Thus, the inductances of the first and second transmission coils Lta and Ltb are increased, and the magnetic coupling of the first transmission coil Lta and the second transmission coil Ltb is increased. As a result, power transmission efficiency can be increased.

Furthermore, in the power receiving coil unit Ltu2 according to the present embodiment, when viewing from a facing direction of the transmission coil unit Ltu2 and the power receiving coil unit Lru2, the outline of the conductive plate Sb is positioned in an outer side than the outline of the magnetic core Ct. Thus, the magnetic coupling of the first and second transmission coils Lta and Ltb and the magnetic body Fb is effectively prevented from excessively increasing by the conductive plate Sb. Also, among the magnetic fluxes which are generated by the first and second transmission coils Lta and Ltb, the magnetic flux which is not interlinked with the first and second power receiving coils Lra and Lrb selectively forms a magnetic path which passes though the magnetic body Fb. As a result, a decrease of power transmission efficiency is suppressed, and an effect in which a leakage magnetic field is reduced is increased even more.

Fourth Embodiment

Figure 5:
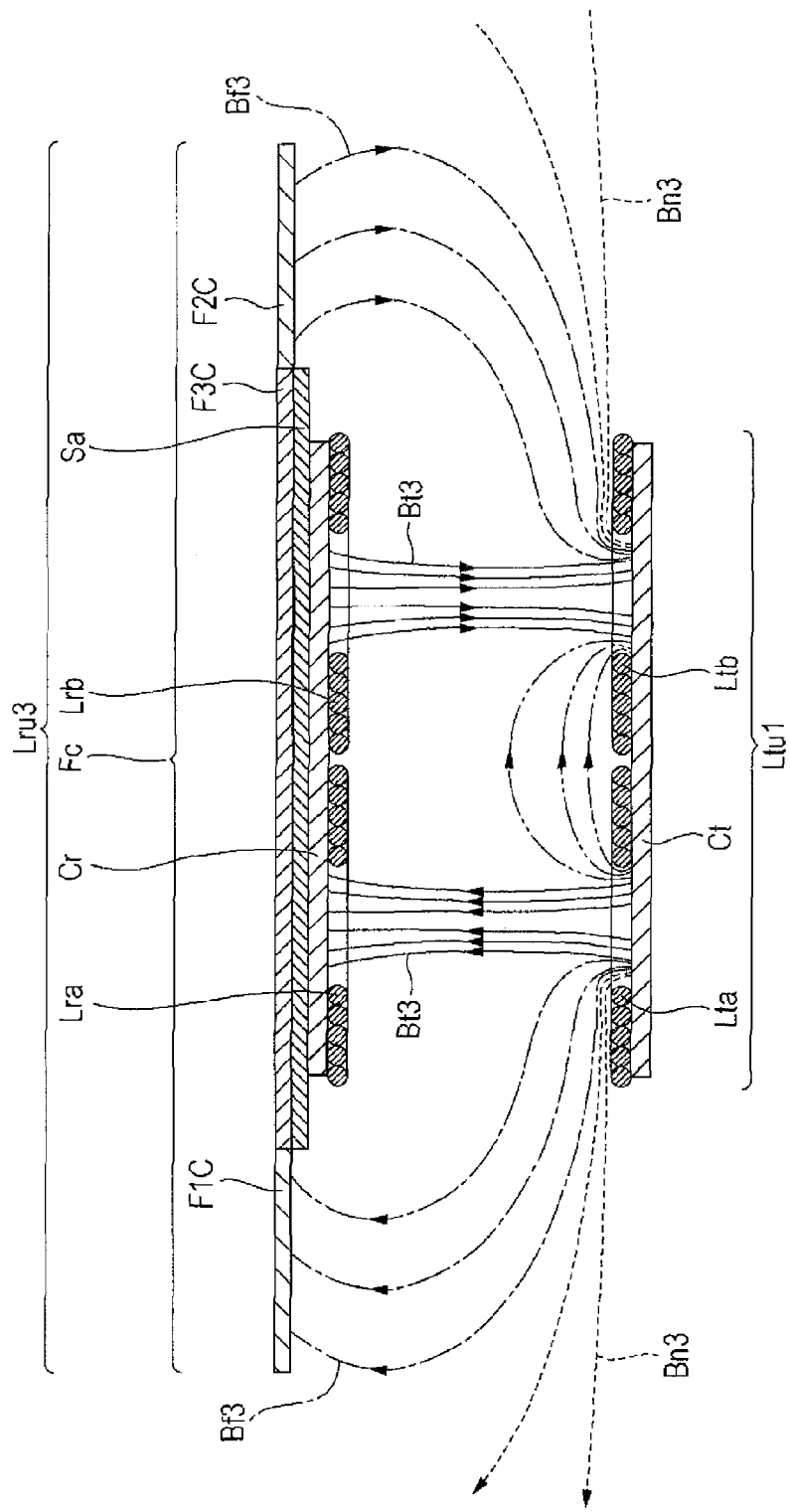
FIG. 5 is a diagram schematically illustrating a magnetic flux which is generated by a transmission coil, in a cross-sectional diagram illustrating a power receiving coil unit according to a fourth embodiment of the present invention and a transmission coil unit.
Figure 6:
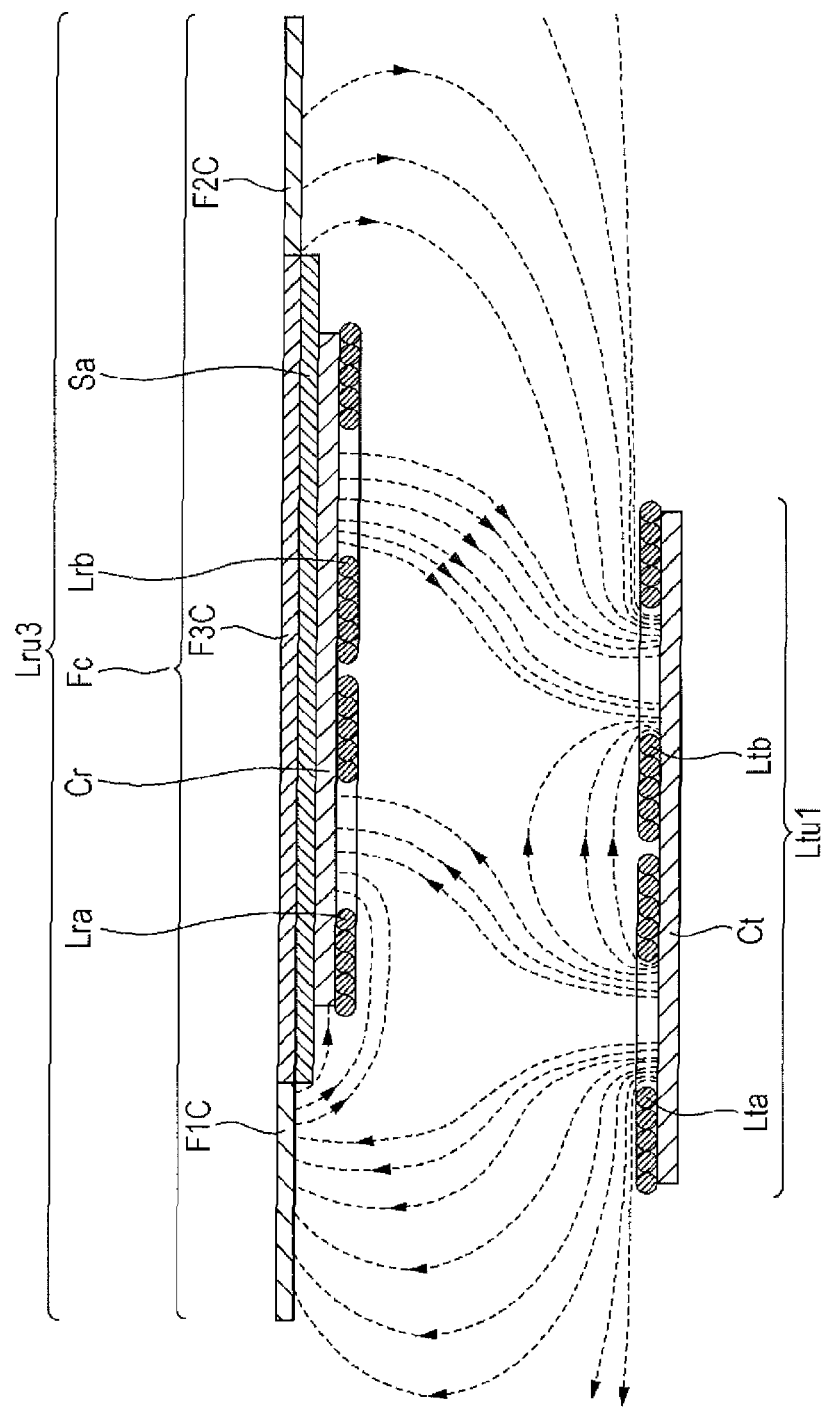
FIG. 6 is a diagram schematically illustrating a magnetic flux which is generated by the transmission coil, in a case in which a positional shift occurs in the transmission coil unit and the power receiving coil unit in FIG. 5.

Next, a wireless power transmission device S3 according to a fourth embodiment will be described with reference to FIG. 5 and FIG. 6. In the present embodiment, an example in which a coil unit according to the present invention is applied to a power receiving coil unit of a wireless power transmission device will be described. FIG. 5 is a diagram schematically illustrating a magnetic flux is generated by a transmission coil, in a cross-sectional diagram illustrating a power receiving coil unit according to a fourth embodiment of the present invention and a transmission coil unit. FIG. 6 is a diagram schematically illustrating magnetic fluxes which are generated by the first and second transmission coils, in a case in which a positional shift occurs in the transmission coil unit and the power receiving coil unit, in FIG. 5. In FIG. 5, magnetic fluxes in the inside of magnetic cores Ct and Cr and a magnetic flux which is generated by the inside of magnetic body Fc are not illustrated. In addition, in FIG. 5, as representations of the magnetic fluxes which are generated by the first and second transmission coils Lta and Ltb, a magnetic flux Bt3 which is interlinked with first and second power receiving coils lra and Lrb, a magnetic flux Bn3 which is widely circulated up to a place separated from the power receiving coil unit Lru3, and a magnetic flux Bf3 which passes through the magnetic body Fc are illustrated.

The wireless power transmission device S3 includes the wireless transmission device Ut1 and a wireless power receiving device Ur3. Furthermore, the wireless power receiving device Ur3 includes the power receiving coil unit Lru3 and the rectification circuit DB. Here, configurations of the wireless transmission device Ut1 and the rectification circuit DB are the same as those of the wireless power transmission device S1 according to the first embodiment. The wireless power receiving device Ur3 of the wireless power transmission device S3 according to the fourth embodiment, is different from that of the first embodiment in that the power receiving coil unit Lru3 is included the wireless power receiving device Ur3 instead of the power receiving coil unit Lru1. Hereinafter, in the coil unit according to the fourth embodiment of the present invention, portions different from those of the first embodiment will be mainly described.

A configuration of the power receiving coil unit Lru3 will be first described with reference to FIG. 5. The power receiving coil unit Lru3 includes the first and second power receiving coils Lra and Lrb, the magnetic core Cr, the conductive plate Sa, and the magnetic body Fc. Here, configurations of the first and second power receiving coils Lra and Lrb, the magnetic core Cr, and the conductive plate Sa are the same as those of the first and second power receiving coils Lra and Lrb included in the power receiving coil unit Lru1 according to the first embodiment, the magnetic core Cr, and the conductive plate Sa. The power receiving coil unit Lru3 according to the present embodiment is different from the power receiving coil unit Lru1 according to the first embodiment in that the magnetic body Fc is included in the power receiving coil unit Lru3 instead of the magnetic body Fa.

The magnetic body Fc includes a first portion F1C, a second portion F2C, and a third portion F3C. When viewing from a facing direction of the first and second power receiving coils Lra and Lrb, the first portion F1C is disposed so as to be positioned on a surface of the conductive plate Sa opposite to a surface which faces the first and second power receiving coils Lra and Lrb. In addition, the first portion F1C is disposed so as to be positioned in an outer side than an outline of one side of the conductive plate Sa in an arrangement direction of the first and second power receiving coils Lra and Lrb. The first portion F1C is configured also by a material such as a ferrite with a relatively low imaginary component value of permeability, among magnetic bodies with high permeability.

When viewing from an arrangement direction of the first and second power receiving coils Lra and Lrb, the second portion F2C is disposed so as to be positioned on a surface side of the conductive plate Sa opposite to a surface which faces the first and second power receiving coils Lra and Lrb. In addition, the second portion F2C is disposed so as to be positioned in an outer side than an outline of the other side of the conductive plate Sa in an arrangement direction of the first and second power receiving coils Lra and Lrb. The second portion F2C is configured also by a material such as a ferrite with a relatively low imaginary component value of permeability, among magnetic bodies with high permeability.

The third portion F3C is disposed along a surface of the conductive plate Sa opposite to a surface which faces the first and second power receiving coils Lra and Lrb. In addition, in the present embodiment, an end (left end of the figure) of one side of the third portion F3C in an arrangement direction of the first and second power receiving coils Lra and Lrb, is connected to the first portion F1C, and an end (right end of the figure) of the other side of the third portion F3C is connected to the second portion F2C. That is, the first and second portions F1C and F2C are connected to each other through the third portion F3C. In this case, a magnetoresistance of a magnetic path which is formed by a magnetic flux which passes through the magnetic body Fc is further lowered, and thus it is possible to more reliably increase a reduction effect of a leakage magnetic field. The third portion F3C is configured by a material such as iron with a relatively high relative permeability.

Here, even if the third portion F3C is configured by a material such as a ferrite with a relatively low imaginary component value of permeability in the same manner as in the first and second portions F1C and F20, it is possible to obtain a reduction effect of a leakage magnetic field. However, as illustrated in FIG. 5, since the third portion F3C has a shape which is longer than the first and second power receiving coils Lra and Lrb, and is a little thin, in a case in which the power receiving coil unit Lru3 according to the present embodiment is mounted in a moving body such as a lower portion of a vehicle, if the third portion F3C is configured by a ferrite, there is a possibility that a mechanical strength of the third portion F3C may not withstand the vibration of the moving body. Thus, it is preferable that the third portion F30 is configured by a magnetic body with a relatively high mechanical strength.

Next, a magnetic flux which is generated by the first and second transmission coils Lta and Ltb according to the present embodiment, and a reduction effect of an unnecessary leakage magnetic field will be described in detail with reference to FIG. 5.

As illustrated in FIG. 5, the first and second transmission coils Lta and Ltb generate the magnetic flux Bt3 which is interlinked with the first and second power receiving coils Lra and Lrb. Since the magnetic flux Bt3 is interlinked with the first and second power receiving coils Lra and Lrb, a electromotive force occurs in the first and second power receiving coils Lra and Lrb. Here, since the conductive plate Sa is installed along a side of the magnetic core Cr opposite to a side which is in contact with the first and second power receiving coils Lra and Lrb, magnetic coupling of the first and second transmission coils Lta and Ltb or the first and second power receiving coils Lra and Lrb, and the magnetic body Fc can be prevented from excessively increasing, and magnetic coupling of the first and second transmission coils Lta and Ltb and the first and second power receiving coils Lra and Lr can be prevented from significantly decreasing.

Meanwhile, as illustrated in FIG. 5, the first and second transmission coils Lta and Ltb generate the magnetic flux Bn3 which is not interlinked with the first and second power receiving coils Lra and Lrb and is widely circulated up to a place separated from the power receiving coil unit Lru3, and the magnetic flux Bf3 which is not interlinked with the first and second power receiving coils Lra and Lrb and passes through the magnetic body Fc. Here, since a magnetic path with a magnetoresistance lower than that of a surrounding space is formed by the magnetic body Fc with a higher permeability than that of the surrounding space, the magnetic flux Bn3 which is widely circulated up to a place separated from the power receiving coil unit Lru3 can be reduced, and an unnecessary leakage magnetic field which is formed in a place separated from the power receiving coil unit Lru3 can be reduced.

Next, with reference to FIG. 6, a case in which a positional shift occurs in the transmission coil unit Ltu1 and the power receiving coil unit Lru3 will be described. FIG. 6 is a diagram schematically illustrating magnetic fluxes which are generated by the first and second transmission coils, in a case in which a positional shift occurs in the transmission coil unit and the power receiving coil unit, in FIG. 5. However, in the same figure, magnetic fluxes in the inside of the magnetic cores Ct and Cr, and the magnetic body Fc are not illustrated. FIG. 6 illustrates a case in which a position of the power receiving coil unit Lru3 is shifted with respect to the transmission coil unit Ltu1, and the first portion F1C of the magnetic body Fc approaches the first transmission coil Lta.

As illustrated in FIG. 6, when the first portion F1C of the magnetic body Fc approaches the first transmission coil Lta, a magnetic flux which passes through the first portion F1C significantly increases. That is, magnetic flux density of the first portion F1C is locally increased. In this way, if magnetic flux density of a magnetic body is increased, there is a possibility that loss and heat generation may be significantly increased. In contrast to this, in the present embodiment, the first portion F1C is configured by a material such as a ferrite with a relatively low imaginary component value of permeability, and thereby even if the magnetic flux density of the first portion F1C is increased, it is possible to reduce a significant loss and heat generation. In addition, even in a case in which the power receiving coil unit Lru3 is shifted in a reverse direction to the direction illustrated in FIG. 6, and the second portion F2C of the magnetic body Fc approaches the second transmission coil Ltb, the second portion F2C is configured by a material such as a ferrite with a relatively low imaginary component value of permeability, in the same manner as above. Thus, even if magnetic flux density of the second portion F2C is increased, it is possible to reduce a significant loss and heat generation.

As described above, in the power receiving coil unit Lru3 according to the present embodiment, the magnetic body Fc includes a first portion F1C which is positioned in an outer side than the outline of one side of the conductive plate Sa in an arrangement direction of the first and second power receiving coils Lra and Lrb, and the second portion F2C which is positioned in an outer side than the outline of the other side of the conductive plate Sa in an arrangement direction of the first and second power receiving coils Lra and Lrb, and thereby a magnetic path with a low magnetoresistance is formed. That is, since the magnetoresistance of the magnetic path which passes through the magnetic body Fc is smaller than the magnetoresistance of the magnetic path which is widely circulated up to a place separated from the power receiving coil unit Lru3, the magnetic flux Bn3 which is widely circulated up to a place separated from the power receiving coil unit Lru3 decreases. As a result, the strength of an unnecessary leakage magnetic field which is formed in a place separated from the power receiving coil unit Lru3 is lowered. Furthermore, by the non-magnetic conductive plate Sa which is disposed in an arrangement direction of the first and second power receiving coils Lra and Lrb, magnetic coupling of the first and second transmission coils Lta and Ltb or the first and second power receiving coils Lra and Lrb and the magnetic body Fc can be prevented from excessively increasing, and thus magnetic coupling of the first and second transmission coils Lta and Ltb and the first and second power receiving coils Lra and Lrb can be prevented from significantly decreasing. As a result, a decrease of power transmission efficiency is suppressed.

Furthermore, the power receiving coil unit Lru3 according to the present embodiment, imaginary component values of permeability of the first and second portions F1C and F2C of the magnetic body Fc are smaller than an imaginary component value of permeability of the third portion F3C. Thus, even if the position of the power receiving coil unit Lru3 is shifted, when the first and second portions F1C and F2C which is positioned in an outer side than the outline of the conductive plate Sa approaches the first and second transmission coils Lta and Ltb which face the power receiving coil unit Lru3, the loss and heat generation of the first and second portions F1C and F2C can be reduced, even if the magnetic flux density of the first and second portions F1C and F2C is locally increased.

Hereinafter, a specific description on a decrease of the unnecessary leakage magnetic field and suppressing of the decrease of power transmission efficiency according to the above-described embodiments will be made using an example and a comparative example.

As an example, the wireless power transmission device S1 according to the first embodiment was used. In addition, in order to compare the example with characteristics as a comparative example, a wireless power transmission device in which the conductive plate Sa and the first and second magnetic body Fa were removed was used in the wireless power transmission device S1 according to the first embodiment.

Figure 7:
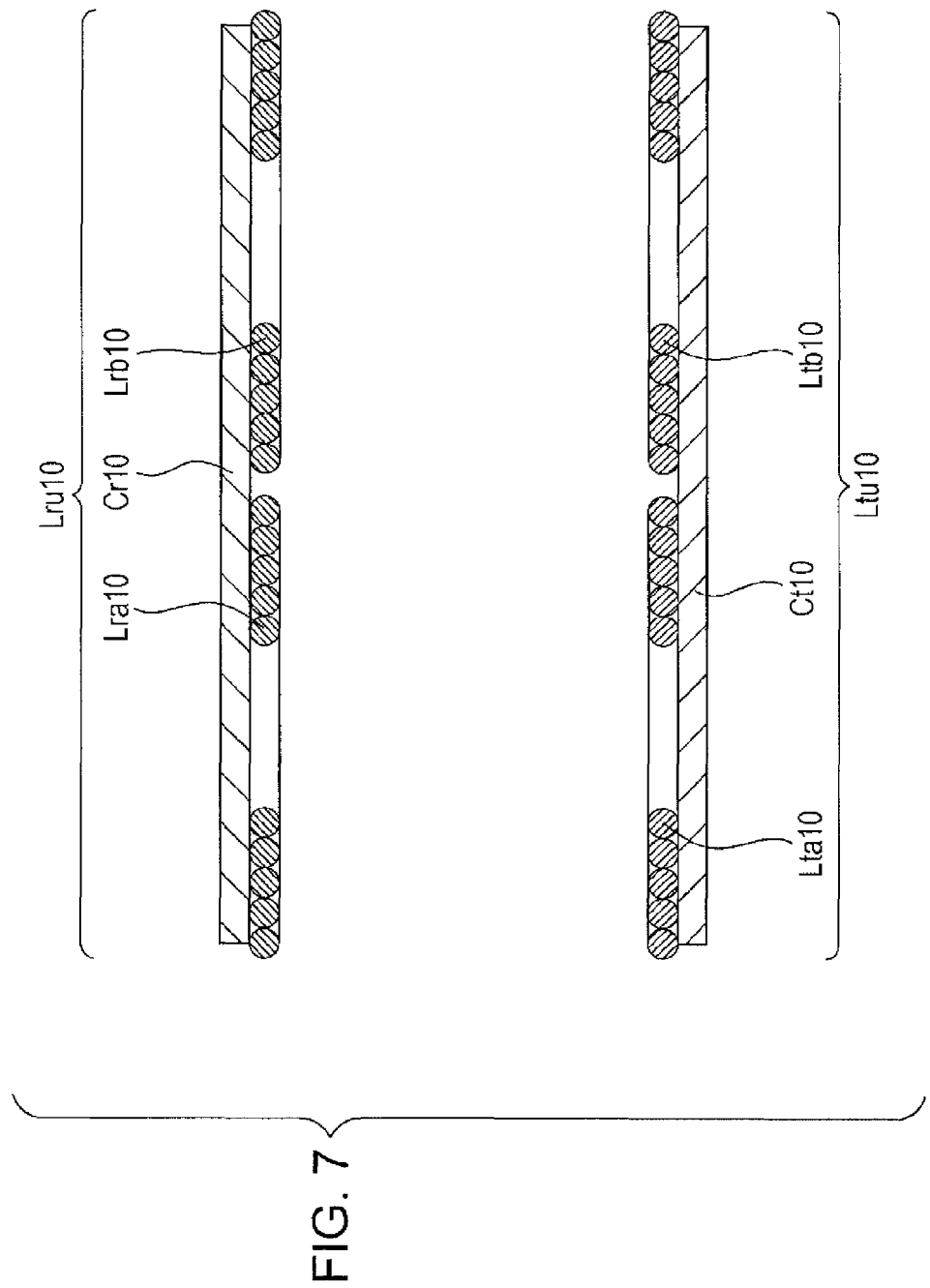
FIG. 7 is a cross-sectional diagram illustrating a power receiving coil unit and a transmission coil unit of a comparative example.

A configuration of a transmission coil unit Ltu10 and a power receiving coil unit Lru10 of a wireless power transmission device of the comparative example will be first described with reference to FIG. 7. FIG. 7 is a cross-sectional diagram illustrating a power receiving coil unit and a transmission coil unit of the comparative example. The transmission coil unit Ltu10 includes first and second transmission coils Lta10 and Ltb10 which are juxtaposed to each other, and a magnetic core Ct10 which is disposed along a rear surface side of the first and second transmission coils Lta10 and Ltb10. A power receiving coil unit Lru10 includes first and second power receiving coils Lra10 and Lrb10 which are juxtaposed to each other, and a magnetic core Cr10 which is disposed along a rear surface side of the first and second power receiving coils Lra10 and Lrb10. Axes of the first and second transmission coils Lta10 and Ltb10, and axes of the first and second power receiving coils Lra10 and Lrb10 are all in parallel to a facing direction of the transmission coil unit Ltu10 and the power receiving coil unit Lru10. That is, in the wireless power transmission device of the comparative example, the conductive plate Sa and the magnetic body Fa are removed from the wireless power transmission device S1 according to the first embodiment.

Here, in the example and the comparative example, a litz wire that is obtained by twisting approximately 4000 copper wires which are coated with polyimide and which have diameters of 0.05 mm, and that has a diameter of approximately 6 mm was used for winding wires of the first and second transmission coils Lta, Ltb, Lta10, and Ltb10 and for winding wires of the first and second power receiving coils Lra, Lrb, Lra10, and Lrb10. In addition, a ferrite (with relative permeability of approximately 3000) with a length 300 mm, a width of 100 mm, and a thickness of 10 mm was used for the magnetic cores Ct, Ct10, Cr, and Cr10. The first and second transmission coils Lta, Ltb, Lta10, and Ltb10, and the first and second power receiving coils Lra, Lrb, Lra10, and Lrb10 are respectively configured by winding a winding wire by 10 turns in a plane shape.

In addition, in the power receiving coil unit Lru1 of the example, an aluminum plate with a length of 450 mm, a width of 250 mm, and a thickness of 3 mm is used as the conductive plate Ca, and a ferrite plate with a length of 550 mm, a width of 250 mm, and a thickness of 3 mm was used as the magnetic body Fa. A magnetic body F was disposed so as to protrude by 50 mm on both outsides in an arrangement direction of the first and second power receiving coils Lra and Lrb of the conductive plate Sa.

Subsequently, in the example and the comparative example, power transmission efficiency and an unnecessary leakage magnetic field have been measured. At this time, in a state in which a distance between the transmission coil units Ltu1 and Ltu10 and the power receiving coil units Lru1 and Lru10 has been set to 100 mm, the transmission coil units Ltu1 and Ltu10 and the power receiving coil units Lru1 and Lru10 have been disposed such that the center of the transmission coil units Ltu1 and Ltu10 and the center of the power receiving coil units Lru1 and Lru10 are identical to each other, when viewing from a facing direction of the transmission coil units Ltu1 and Ltu10 and the power receiving coil units Lru1 and Lru10. In addition, in order to adjust an impedance of an electrical circuit, a capacitor with a capacitance according to an impedance of a coil is inserted in parallel to the first and second transmission coils Lta, Ltb, Lta10, and Ltb10, and the first and second power receiving coils Lra, Lrb, Lra10, Lrb10, and the measurement has been performed. A supplying power of the power supply PW was adjusted such that the power which is supplied to the load R is 1.5 kW.

As the power transmission efficiency, while taking into account loss of the inverter INV and loss of the rectification circuit DE which was measured in ad advance, an efficiency between the transmission coil units Ltu1 and Ltu10 and the power receiving coil units Lru1 and Lru10 has been calculated, based on the measured result of the power which is supplied by the power supply PW and the power which is supplied to the load R.

For an unnecessary leakage magnetic field, a magnetic field strength on a position separated from the center of the power receiving coil units Lru1 and Lru10 by 10 m has been used as an indicator. In a state in which a loop antenna was installed in a position separated by 10 m in an arrangement direction of the first and second power receiving coils Lra, Lrb, Lra10, and Lrb10 from the center of the power receiving coil units Lru1 and Lru10, the magnetic field strength has been measured. Here, in the loop antenna, magnetic field strengths in three orthogonal directions (X,Y,Z directions) have been measured, and by synthesizing the magnetic field strengths, the leakage magnetic field has been calculated. The transmission coil units Ltu1 and Ltu10 have been installed in a position with a height of 500 mm from a floor surface, such that a surface through power is transmitted faces the top. The power receiving coil units Lru1 and Lru10 have been installed above the transmission coil units Ltu1 and Ltu10, so as to be disposed at an interval of 100 mm. In addition, the loop antenna was installed such that its center is positioned in a height of 1.5 m from the floor of a radio anechoic chamber.

Figure 8:
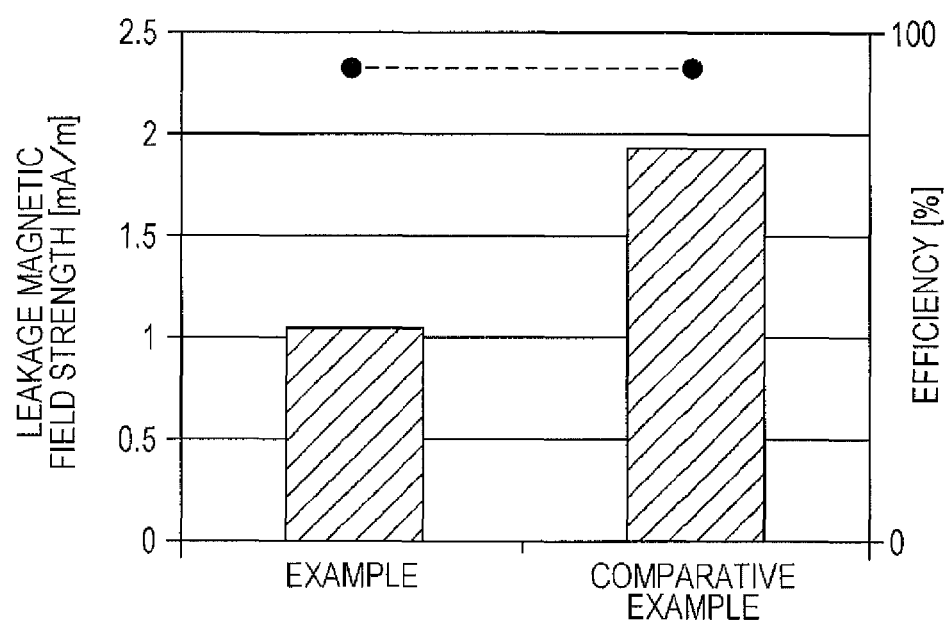
FIG. 8 is a measurement result of a leakage magnetic field strength and power transmission efficiency of an example and a comparative example.

The measured results of the example and the comparative example are illustrated in FIG. 8. In the figure, a bar graph indicates a leakage magnetic field strength, and a line graph indicates power transmission efficiency.

If the measured result of the example is compared to the measured result of the comparative example, the power transmission efficiency in the example is approximately the same as the power transmission efficiency in the comparative example. In contrast to this, the leakage magnetic field strength in the example is significantly lower than the leakage magnetic field strength in the comparative example. That is, in the example, it can be seen that the leakage magnetic field strength is reduced without decreasing the power transmission efficiency. As described above, it is confirmed that the power receiving coil unit Lru1 in the example can reduce an unnecessary leakage magnetic field which is formed in a separated place, without a decrease of the power transmission efficiency.

As described above, the preset invention is described based on the embodiments. It is understood by those skilled in the art that the embodiments are exemplifications, various modifications and changes are possible within the scope of the present invention, and such modifications and changes are included in the scope of the present invention. Thus, the description and drawings in the specification are not limitative, and must be illustratively treated.

What is claimed is:

1. A coil unit which wirelessly transmits power from a transmission side to a power receiving side, comprising:
   first and second coils in which directions of magnetic fields generated when a current flows are reversed to each other, and are apposed;
   a non-magnetic conductive plate which is disposed along an arrangement direction of the first and second coils, axes of the first and second coils being perpendicular to the arrangement direction, the first and second coils forming a magnetic path that is interlinked with both of the first and second coils; and
   a magnetic body that allows magnetic fluxes to pass through,
   wherein the magnetic body includes a first portion which is positioned in an outer side than an outline of one side of the conductive plate in the arrangement direction, and a second portion which is positioned in an outer side than an outline of the other side of the conductive plate in the arrangement direction, and
   wherein when viewing from the arrangement direction, the first and second portions are positioned on a side of the conductive plate where is opposite to a side which faces the first and second coils.

2. The coil unit according to claim 1,
   wherein the magnetic body further includes a third portion which is positioned between the first portion and the second portion, and
   wherein imaginary component values of permeability of the first and second portions are smaller than an imaginary component value of permeability of the third portion.

3. The coil unit according to claim 1 further comprising:
   a magnetic core which is disposed along the arrangement direction and between the first and second coils and the conductive plate.

4. A wireless power transmission device which wirelessly transmits power by a transmission coil unit and a power receiving coil unit facing each other, comprising:
   first and second transmission coils in which directions of magnetic fields generated when a current flows are reversed to each other, and are apposed;
   the transmission coil unit that includes a magnetic core which is disposed along an arrangement direction of the first and second transmission coils; and
   the power receiving coil unit which is configured with the coil unit according to claim 1,
   wherein when viewing from a facing direction of the transmission coil unit and the power receiving coil unit, an outline of the conductive plate of the power receiving coil unit is positioned in an outer side than an outline of the magnetic core.

5. A wireless power transmission device which wirelessly transmits power by a transmission coil and a power receiving coil unit facing each other, comprising:

the transmission coil in which a winding wire is wound on a magnetic core; and the power receiving coil unit which is configured with the coil unit according to claim 1, wherein when viewing from a facing direction of the transmission coil and the power receiving coil unit, an outline of the conductive plate of the power receiving coil unit is positioned in an outer side than an outline of the magnetic core.

6. A wireless power transmission device which wirelessly transmits power by a transmission coil unit and a power receiving coil facing each other, comprising:

the transmission coil unit which is configured with the coil unit according to to claim 3; and the power receiving coil, wherein when viewing from a facing direction of the transmission coil unit and the power receiving coil, an outline of the conductive plate of the transmission coil unit is positioned in an outer side than an outline of the magnetic core.

7. The coil unit according to claim 2 further comprising:

a magnetic core which is disposed along the arrangement direction and between the first and second coils and the conductive plate.

8. A wireless power transmission device which wirelessly transmits power by a transmission coil unit and a power receiving coil unit facing each other, comprising:

first and second transmission coils in which directions of magnetic fields generated when a current flows are reversed to each other, and are apposed;

the transmission coil unit that includes a magnetic core which is disposed along an arrangement direction of the first and second transmission coils; and the power receiving coil unit which is configured with the coil unit according to claim 2, wherein when viewing from a facing direction of the transmission coil unit and the power receiving coil unit, an outline of the conductive plate of the power receiving coil unit is positioned in an outer side than an outline of the magnetic core.

9. A wireless power transmission device which wirelessly transmits power by a transmission coil unit and a power receiving coil unit facing each other, comprising:

first and second transmission coils in which directions of magnetic fields generated when a current flows are reversed to each other, and are apposed;

the transmission coil unit that includes a magnetic core which is disposed along an arrangement direction of the first and second transmission coils; and the power receiving coil unit which is configured with the coil unit according to claim 3, wherein when viewing from a facing direction of the transmission coil unit and the power receiving coil unit, an outline of the conductive plate of the power receiving coil unit is positioned in an outer side than an outline of the magnetic core.

10. A wireless power transmission device which wirelessly transmits power by a transmission coil unit and a power receiving coil unit facing each other, comprising:

first and second transmission coils in which directions of magnetic fields generated when a current flows are reversed to each other, and are apposed;

the transmission coil unit that includes a magnetic core which is disposed along an arrangement direction of the first and second transmission coils; and the power receiving coil unit which is configured with the coil unit according to claim 7, wherein when viewing from a facing direction of the transmission coil unit and the power receiving coil unit, an outline of the conductive plate of the power receiving coil unit is positioned in an outer side than an outline of the magnetic core.

11. A wireless power transmission device which wirelessly transmits power by a transmission coil and a power receiving coil unit facing each other, comprising:

the transmission coil in which a winding wire is wound on a magnetic core; and the power receiving coil unit which is configured with the coil unit according to claim 2, wherein when viewing from a facing direction of the transmission coil and the power receiving coil unit, an outline of the conductive plate of the power receiving coil unit is positioned in an outer side than an outline of the magnetic core.

12. A wireless power transmission device which wirelessly transmits power by a transmission coil and a power receiving coil unit facing each other, comprising:

the transmission coil in which a winding wire is wound on a magnetic core; and the power receiving coil unit which is configured with the coil unit according to claim 3, wherein when viewing from a facing direction of the transmission coil and the power receiving coil unit, an outline of the conductive plate of the power receiving coil unit is positioned in an outer side than an outline of the magnetic core.

13. A wireless power transmission device which wirelessly transmits power by a transmission coil and a power receiving coil unit facing each other, comprising:

the transmission coil in which a winding wire is wound on a magnetic core; and the power receiving coil unit which is configured with the coil unit according to claim 7, wherein when viewing from a facing direction of the transmission coil and the power receiving coil unit, an outline of the conductive plate of the power receiving coil unit is positioned in an outer side than an outline of the magnetic core.

14. A wireless power transmission device which wirelessly transmits power by a transmission coil unit and a power receiving coil facing each other, comprising:

the transmission coil unit which is configured with the coil unit according to to claim 7; and the power receiving coil, wherein when viewing from a facing direction of the transmission coil unit and the power receiving coil, an outline of the conductive plate of the transmission coil unit is positioned in an outer side than an outline of the magnetic core.

* * * * *